(12) United States Patent
Suzuki et al.

(10) Patent No.: US 7,219,358 B2
(45) Date of Patent: May 15, 2007

(54) LENS DRIVE DEVICE HAVING METAL WIRE-LIKE ELASTIC MEMBERS, AND METHOD FOR MANUFACTURING THE SAME

(75) Inventors: Jun Suzuki, Tokorozawa (JP); Katsumi Ishii, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/778,015

(22) Filed: Feb. 7, 2001

(65) Prior Publication Data

US 2001/0017490 A1 Aug. 30, 2001

(30) Foreign Application Priority Data

Feb. 9, 2000 (JP) .............................. 2000-032506

(51) Int. Cl.
G11B 7/22 (2006.01)
(52) U.S. Cl. ...................................... 720/682
(58) Field of Classification Search ................. 369/244, 369/247, 44.15, 44.16, 44.22; 720/681, 682
See application file for complete search history.

(56) References Cited

U.S. PATENT DOCUMENTS 5,068,844 A * 11/1991 Tanaka ..................... 369/44.16

5,627,687 A 5/1997 Fujisawa
6,404,728 B1 * 6/2002 Shinozuka et al. ......... 369/244

FOREIGN PATENT DOCUMENTS

| EP | 0 516 390 A2 | 12/1992 |
| EP | 0784315 A1 | 7/1997 |
| JP | 9-282690 | 10/1997 |

* cited by examiner

Primary Examiner—Hoa T. Nguyen
Assistant Examiner—Mark Blouin
(74) Attorney, Agent, or Firm—Sughrue Mion, PLLC

(57) ABSTRACT

A lens drive device in which a lens holder forming a moving unit and connection wires for connecting a plurality of drive coils electrically are integrally molded, and a method for manufacturing the lens drive device. This lens drive device is constructed to include: an actuator unit in which four wire-form elastic members made of a metal are molded integrally with the lens holder and an actuator base and in which connection wires for connecting a printed circuit board A coil and a printed circuit board B coil are integrally molded; and a suspension base having a pair of yokes fixing a pair of magnets arranged to confront each other through a predetermined magnetic space.

11 Claims, 19 Drawing Sheets

LENS DRIVE DEVICE HAVING METAL WIRE-LIKE ELASTIC MEMBERS, AND METHOD FOR MANUFACTURING THE SAME

BACKGROUND OF THE INVENTION

1. Field of the Invention

The present invention relates to a lens drive device for writing or reading information optically to or from a disk-shaped recording medium such as a compact disk or an optical disk and its manufacturing method.

2. Description of Related Art

Conventionally, there has been known a pickup drive device 1 for reproducing the information which has been recorded in an optical disk such as the CD or the DVD. In order to read out the information recorded in the optical disk precisely, the pickup drive device performs: a focusing control to control the distance between the information recorded face and an objective lens against the warpage or deviation of the optical disk; and a tracking control to follow and control an objective lens with respect to the eccentricity of the information track of the optical disk.

The conventional pickup device is constructed to include a lens holder and a moving unit having focusing coils, tracking coils and so on. The coils are fixed on the lens holder and are then electrically connected. The pickup device has a problem that the manufacturing works are complicated to take a long time. Moreover, the leader wires are led around in the space near the lens holder. There is another problem in that the leader wires come into contact with another member at the time of driving the lens holder so that brokage of leader wires may occur.

OBJECTS AND SUMMARY OF THE INVENTION

The invention has been conceived in view of the above-specified problems and has an object to provide a lens drive device, in which a lens holder forming a moving unit and connection wires for connecting a plurality of drive coils electrically are integrally molded, and a method for manufacturing the lens drive device.

In order to solve those problems, according to a first aspect of the invention, there is provided a lens drive device comprising a lens holder to which an objective lens and a plurality of drive coils are fixed, and a plurality of wire-form elastic members made of a metal for supporting the lens holder, in which the drive coils are energized through the wire-form elastic members.

The lens holder is molded out of a resin integrally with connection wires for connecting the drive coils electrically.

In a lens drive device according to a second aspect of the invention, on the other hand, the lens holder is molded integrally with the connection wires while containing at least portions of the connection wires and while being exposed at its two ends, so that the exposed portions may be connection terminals to the drive coils.

According to a third aspect of the invention, on the other hand, there is provided a lens drive device in which a lens holder and a suspension base are integrally molded out of a resin on the two end sides of a plurality of wire-form elastic members made of a metal, in which an objective lens and a plurality of drive coils are fixed on the molded lens holder, and in which the drive coils are energized through the wire-form elastic members. The wire-form elastic members made are provided at their one ends with connection terminals which are partially exposed from the lens holder and connected with the drive coils, and connection wires for connecting the drive coils are integrally molded while being contained in the lens holder.

In the lens drive device of the third aspect of the invention, according to a fourth aspect of the invention, the connection wires are provided at their two ends with connection terminals to be connected with the drive coils, and the connection terminals are exposed from the lens holder.

According to a fifth aspect of the invention, on the other hand, there is provided a suspension unit for a lens drive device, in which a lens holder and a suspension base are integrally molded out of a resin on the two end sides of a plurality of wire-form elastic members made of a metal. Connection wires for electrically connecting the drive coils to be fixed on the lens holder are integrally molded while being contained in the lens holder.

According to a sixth aspect of the invention, on the other hand, there is provided a method for manufacturing a lens drive device, in which a lens holder for fixing an objective lens and a plurality of drive coils to be electrically connected through connection wires thereon and a suspension base are jointed through a plurality of wire-form elastic members made of a metal, to support the lens holder movably and to energize the drive coils through the wire-form elastic members. The method comprises: a first step of positioning the wire-form elastic members and the connection wires in predetermined positional relations; a second step of molding a lens holder of a resin integrally with the wire-form elastic members and the connection wires at one end of the wire-form elastic members and a suspension base of a resin integrally with the wire-form elastic members on the other end side of the wire-form elastic members; and a third step of fixing the objective lens and the drive coils on the lens holder and connecting the wire-form elastic members and the terminals of the connecting parts with the terminals of the drive coils.

In the lens drive device manufacturing method according to the sixth aspect of the invention, according to a seventh aspect of the invention, the wire-form elastic members and the connection wires are jointed and positioned relative to each other through joint parts at the first step and the second step. The method further comprises a step of cutting the joint parts between the second step and the third step.

DETAILED DESCRIPTION OF THE PREFERRED EMBODIMENTS

Before entering into the description of the embodiments of the pickup device according to the invention, the pickup device of the prior art will be described with reference to the accompanying drawings.

Figure 1:
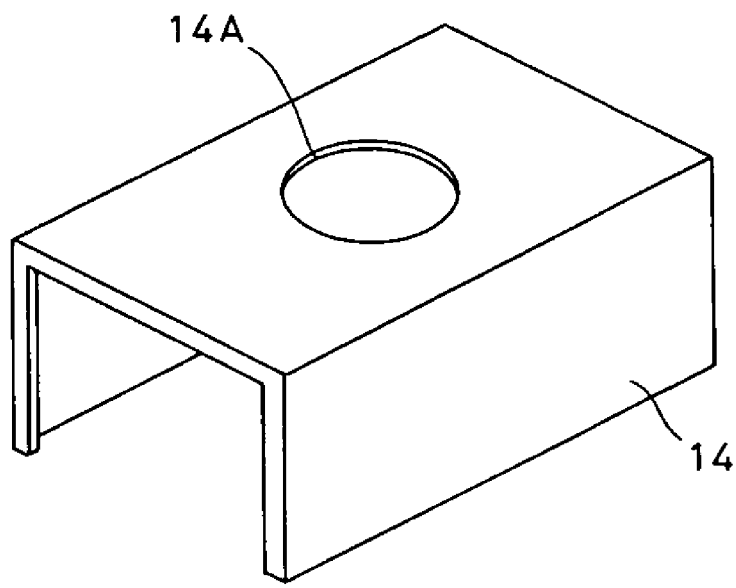
FIG. 1 is an exploded perspective view showing the structure of a pickup device of the prior art.
Figure 1:
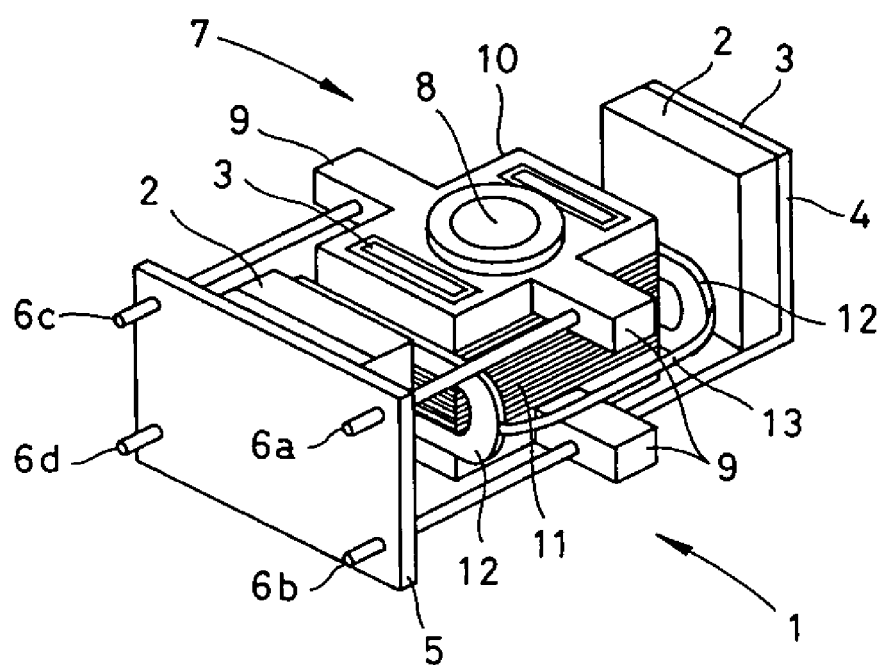

FIG. 1 is a perspective view showing one example of the pickup device of the prior art.

A pickup drive device 1 is constructed to include: a plate-shaped actuator base 4 on which yokes 3 fixing a pair of magnets 2 are arranged to confront each other; a moving unit 7 supported movably by four support wires 6a to 6d on a support base 5 fixed on the side face of the actuator base 4 by means of screws (not shown in the figure); an actuator cover 14 formed of a metal sheet or a resin into a box shape and having an aperture 14A for an objective lens 8 formed in the top portion for protecting the moving unit 7; and a pickup body (not shown) for housing optical parts including a light source, a collimator lens and a beam splitter. The moving unit 7 is constructed to include: a lens holder 10 holding the objective lens 8 therein and having four stationary arms 9 projecting in a tracking direction; a focusing coil 11 wound on the trunk of the lens holder 10; and D-shaped four tracking coils 12 confronting the magnets 2 and fixed on the two side faces of the lens holder 10. On the other hand, the moving unit 7 is supported movably with respect to the actuator base 4 because the four stationary arms 9 of the lens holder 10 are fixed on the four support wires 6a to 6d disposed on the suspension base 5.

The four support wires 6a to 6d are made of electrically conductive, elastic members so that they may support the moving unit 7 movably and so that they may be used as connection wires for feeding a drive current to the focusing coil 11 and the four tracking coils 12.

The focusing coil 11, as wound on the trunk of the lens holder 10, is connected at its one terminal with the support wire 6a and at its other terminal with the support wire 6b, for example. As the focusing drive current is fed to the two support wires 6a and 6b of the support base 5, therefore, the moving unit 7 is driven in the focusing direction.

On the four tracking coils 12, as fixed on the two side faces of the lens holder 10, are connected in series by using the two support wires 6c and 6d and lead wires 13. Specifically, the four tracking coils 12 are connected in series with the two support wires 6c and 6d by connecting one support wire 6c with one terminal of the two tracking coils 12 connected in series and fixed on one side face of the lens holder 10, by connecting the other support wire 6d with one terminal of the two tracking coils 12 connected in series and fixed on the other side face of the lens holder 10, and by connecting the other terminals of the tracking coils 12 through the lead wires. As the tracking drive current is fed to the two support wires 6c and 6d, therefore, the moving unit 7 is driven in the tracking direction.

In the pickup drive device 1 thus far described, the two tracking coils 12, as fixed on one side face of the lens holder 10 constructing the moving unit 7, and the two tracking coils 12, as fixed on the other side face of the lens holder 10, are connected by using the lead wires 13. However, the electric connecting works of the coils are performed after the coils were fixed on the lens holder, as described before, so that the manufacturing works are complicated to take time. On the other hand, the lead wires are wired in the space near the lens holder to raise a problem that the lens holder comes, when driven, into contact with another member thereby to cause a disconnection.

Figure 2:
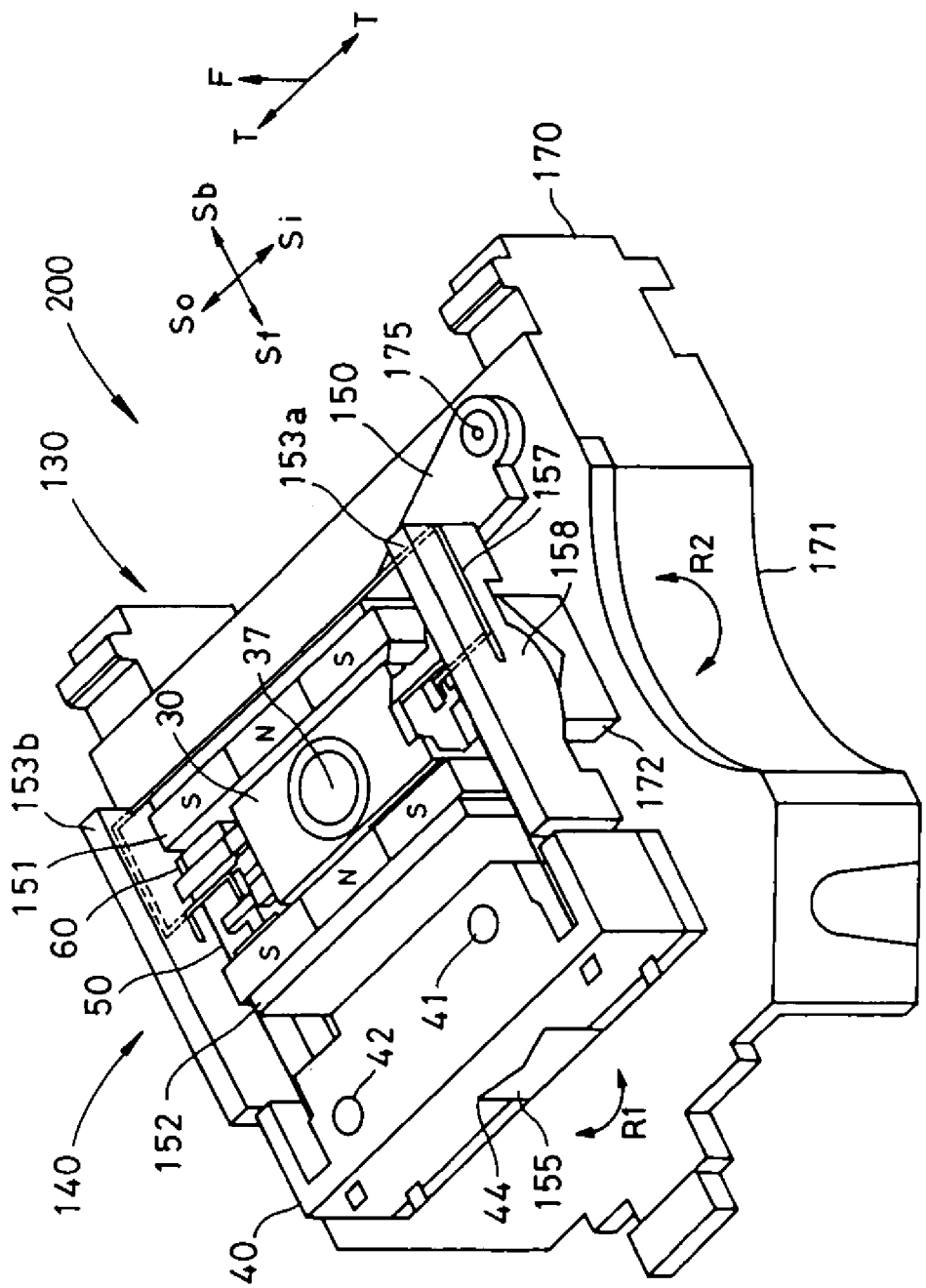
FIG. 2 is a perspective view of a pickup device according to an embodiment of the invention.
Figure 3:
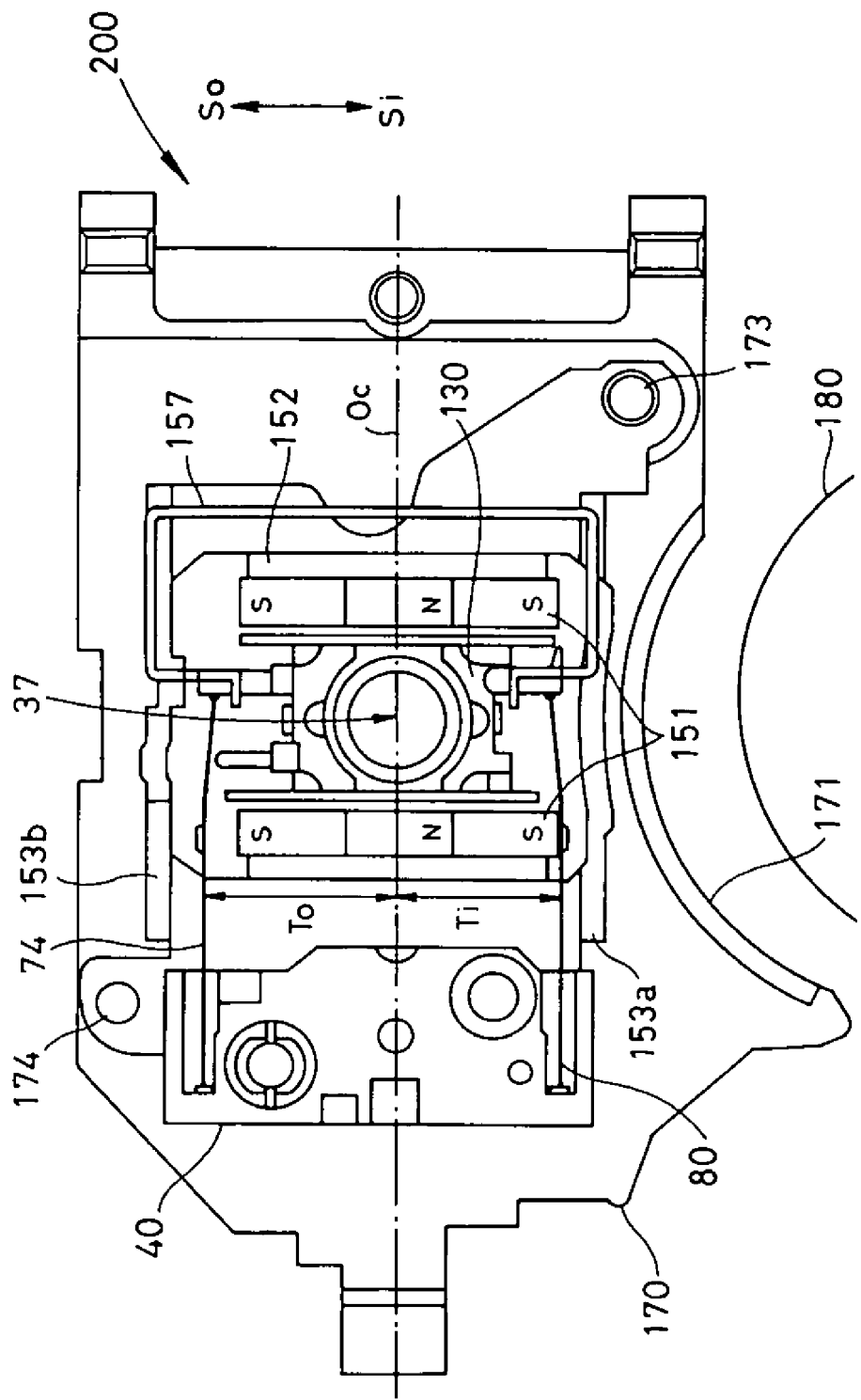
FIG. 3 is a top plan view of the pickup device according to the embodiment of the invention.
Figure 4:
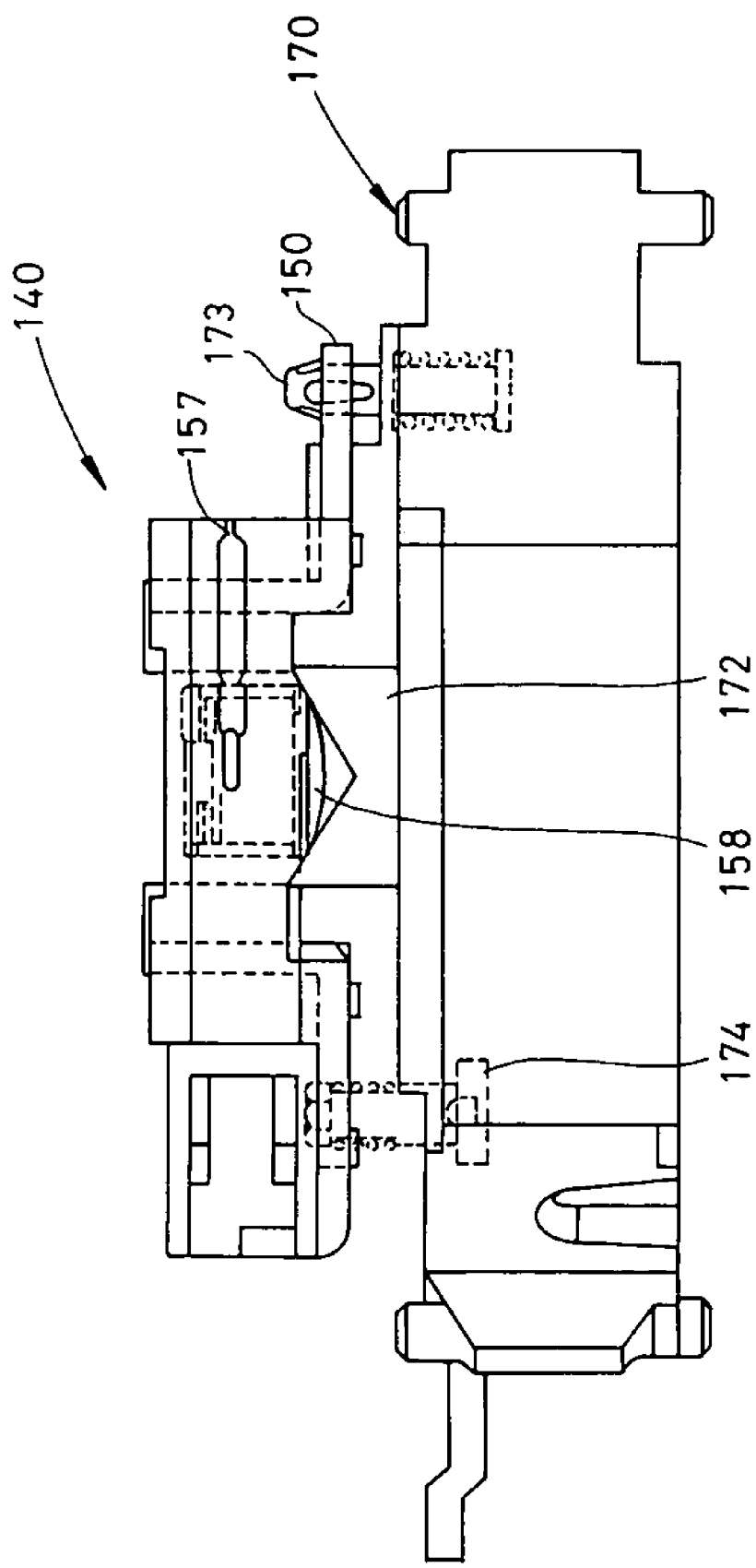
FIG. 4 is a side elevation of the inner peripheral side of the pickup device according to the embodiment of the invention.

FIG. 2 is a perspective view of an essential portion of a pickup device 200 according to an embodiment of the invention. On the other hand, FIG. 3 is a top plan view of the pickup device 200, and FIG. 4 is a side elevation, when taken from the side of a spindle motor 180, of the pickup device 200. The construction of the pickup device 200 will be described in the following with reference to FIGS. 2 to 4.

The pickup device 200 of the invention is constructed to include: an actuator unit 140 connecting a moving unit 130, as having a printed circuit board A coil 50 and a printed circuit board B coil 60 fixed on the two side faces of a lens holder 30 holding an objective lens 37, to an actuator base 40 by four wire-form elastic members 74, 94, 80 and 104 and supporting the moving unit 130 movably; a suspension base 150 equipped with a pair of yokes 152, which fix a pair of multi-pole magnetized magnets 151 composed of an I-shaped N-pole and a U-shaped S-pole arranged on the two side faces of the moving unit 130 to confront each other through a predetermined magnetic space, and having upright portions 153 arranged to confront each other while enclosing the side face of the moving unit 130 in the tracking direction (as indicated by arrow T); and a pickup body 170 die-cast of aluminum for housing optical parts including a light source, a collimator lens and a beam splitter, although not shown, and having a semicircular recess 171 in the side face (as will be called the "inner peripheral direction", as indicated by arrow Si whereas an outer peripheral direction will be indicated by So) close to the spindle motor 180.

The actuator unit 140 is fixed on the actuator base 40 by inserting a not-shown screw with a spring and a fixing screw into two mounting holes 41 and 42 of the actuator base 40. The actuator unit 140 is fixed at an adjusted position in the direction, as indicated by arrow R1 in FIG. 2, by a V-shaped groove formed in the bottom face of the actuator base 40 and by an M-shaped projecting plate 155 formed on the suspension base 150. On the other hand, the actuator unit 140 is fixed by fitting at its one end on a post 173 with a spring, as fixed on a pickup body 175, and by fixing its other end by a fixing screw 174. The suspension base 150 is fixed at an arranged position in the direction of arrow R2 by projections 158, as formed on right and left upright portions 153a and 153b, and M-shaped holding portions 172 of the pickup body 170.

The pickup device 200 of the embodiment of the invention is enabled to approach the side of the spindle motor 180 by forming the semicircular recess 171 in the side face of the pickup body 170 in the inner peripheral direction Si. In the pickup device 200, on the other hand, the distance Ti from the wire-form elastic members 80 and 104 supporting the moving unit 130 to the optical center (i.e., Oc containing the optical axis of the objective lens 37 and perpendicular to the tracking direction) of the objective lens 37 is made shorter than the distance To from the wire-form elastic members 74 and 94 to the optical center line Oc of the objective lens 37, as shown in FIG. 3. Thus, the wire-form elastic members 74 and 94 and the wire-form elastic members 80 and 104 supporting the moving unit 130 are positioned asymmetric with respect to the optical center line Oc of the objective lens 37 so that the objective lens 37 of the pickup device 200 can be brought closer to the inner circumferential side of the optical disk.

As described above, the pickup device 200 of the embodiment of the invention is constructed to come closer to the spindle motor 180 and the inner circumferential side of the optical disk by forming the semicircular recess 171 in the pickup body 170 and by fixing the four wire-form elastic members 74, 94, 80 and 104 for supporting the moving unit 130, asymmetric with respect to the optical center line Oc of the objective lens 37.

Figure 5:
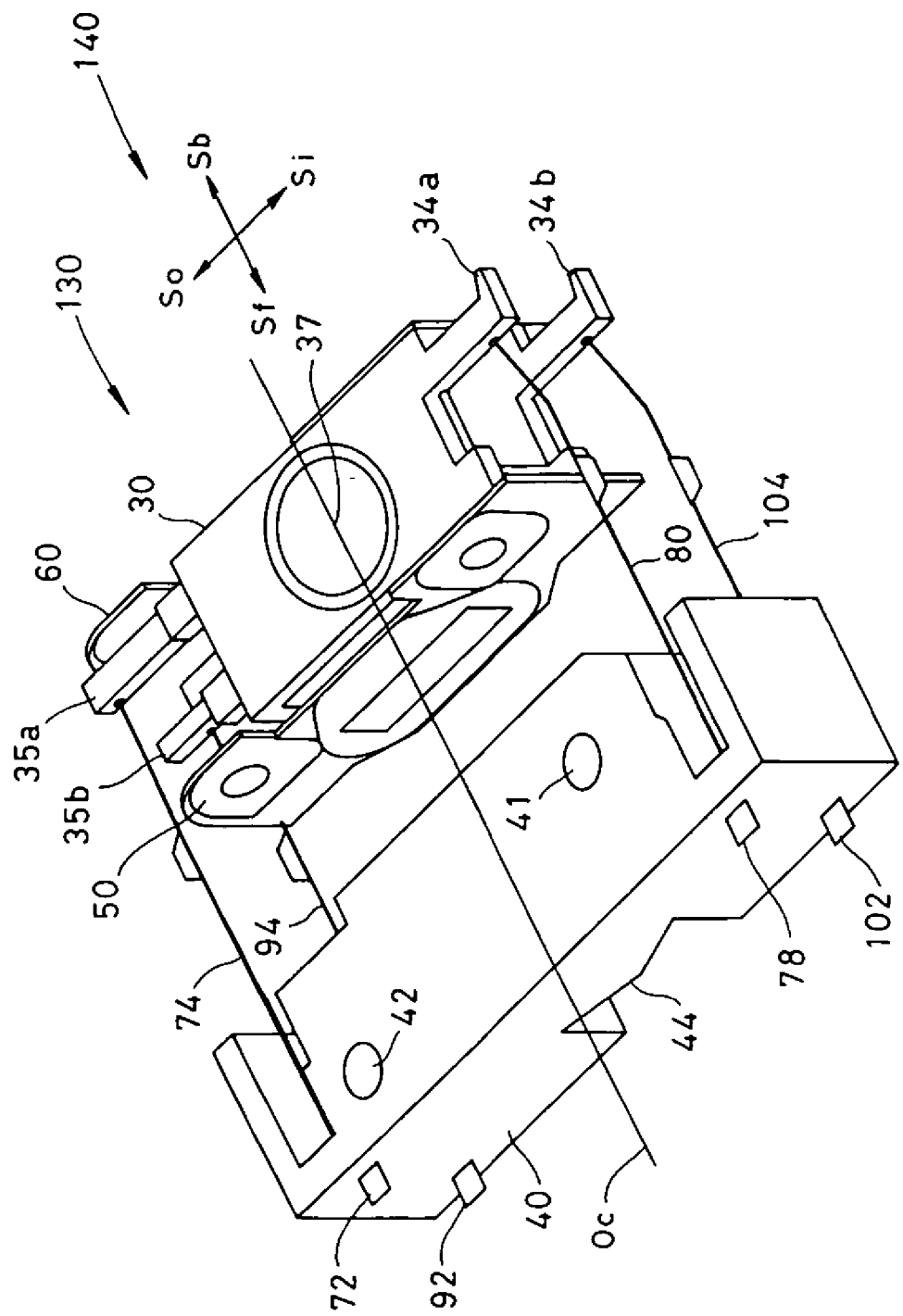
FIG. 5 is a perspective view of an actuator unit forming the pickup device.

The moving unit 130 thus constructed establishes the angular moment, but the pickup device 200 of the embodiment of the invention is made small and light without establishing the angular moment by devising the structure of the actuator unit 140. With reference to FIG. 5, therefore, here will be described not only the entire structure of the actuator unit 140 to be used in the pickup device 200 according to the embodiment of the invention but also the structures of the individual components of the actuator unit 140.

The actuator unit 140 is constructed, as shown in FIG. 5 such that the printed circuit board A coil 50 is fixed on the front side face (as indicated by arrow Sf) of the lens holder 30 having the objective lens 37 held therein and such that the moving unit 130 having the printed circuit board B coil 60 fixed on the back side face (as indicated by arrow Sb) of the lens holder 30 is movably supported by the four wire-form elastic members 74, 80, 94 and 104 fixed on the actuator base 40. These four wire-form elastic members 74, 80, 94 and 104 constructing the actuator unit 140 are integrally molded by the inserting molding method when the lens holder 30 and the actuator base 40 are molded out of a resin.

Figure 6A:
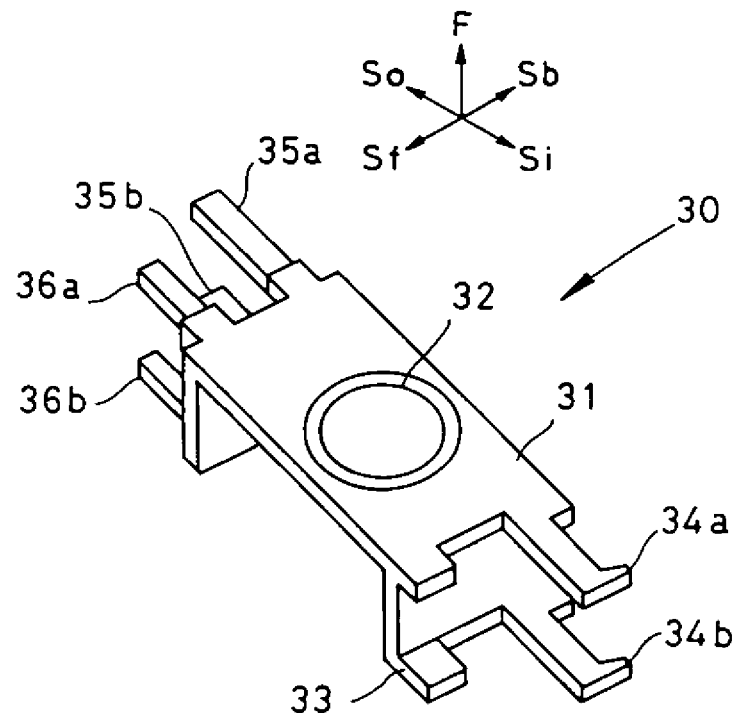
FIGS. 6A and 6B are perspective views of a lens holder and an actuator base forming a moving unit.
Figure 6B:
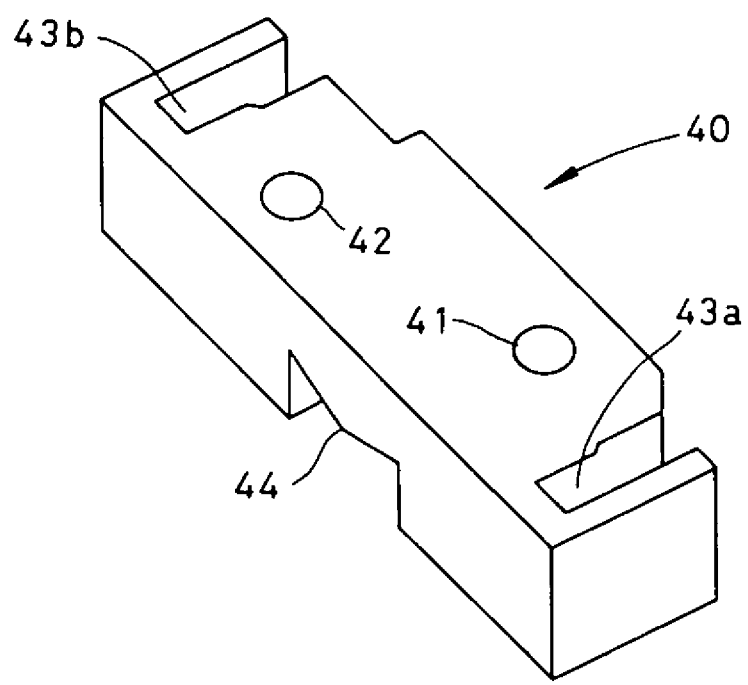

The lens holder 30 and the actuator base 40 constructing the actuator unit 140 have the structures shown in FIGS. 6A and 6B. Here, FIG. 6A is a perspective view of the lens holder 30, and FIG. 6B is a perspective view of the actuator base 40.

The lens holder 30 is a generally rectangular member molded out of a resin and having a hollow structure and is provided at a central portion of a top face 31 with an aperture 32 for the objective lens 37. The lens holder 30 is constructed to include: a pair of fixing arms 34a and 34b or elastic member fixing portions located on the back side Sb of the lens holder 30 and extending horizontally in the inner peripheral direction Si from the top face 31 and a bottom face 33 positioned at a spacing from the top face 31 in the focusing direction (as indicated by arrow F); a pair of fixing arms 35a and 35b or other elastic member fixing portions located on the back side Sb of the lens holder 30 and extending horizontally in the outer peripheral direction So from the top face 31 and the bottom face 33; and a pair of projecting portions 36a and 36b or terminal fixing portions located on the front side Sf of the lens holder 30 and extending horizontally in the outer peripheral direction So from the top face 31 and the bottom face 33.

As shown in FIG. 6B, on the other hand, the actuator base 40 is a generally rectangular member molded out of a resin and including: the two mounting holes 41 and 42 formed for fixing it on the suspension base 150; grooves 43a and 43b molded integrally with the four wire-form elastic members 74, 80, 94 and 104 on the two longitudinal sides; and a V-shaped groove 44 formed in the bottom portion for adjusting the position.

Figure 7:
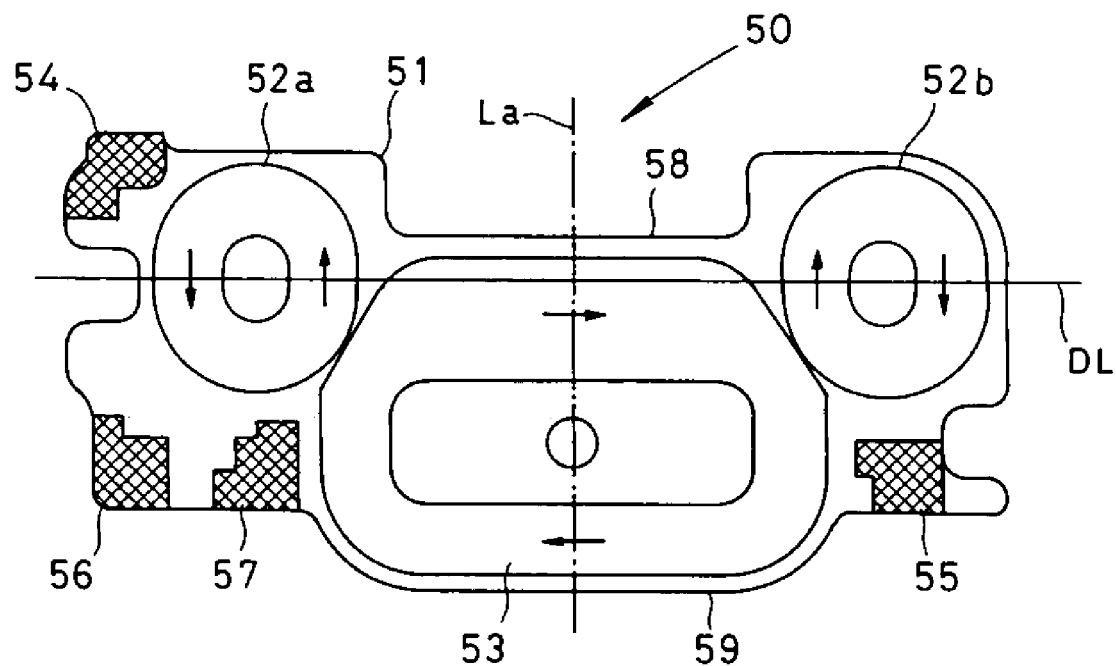
FIG. 7 is a structural diagram of a printed circuit board A coil forming the moving unit.
Figure 8:
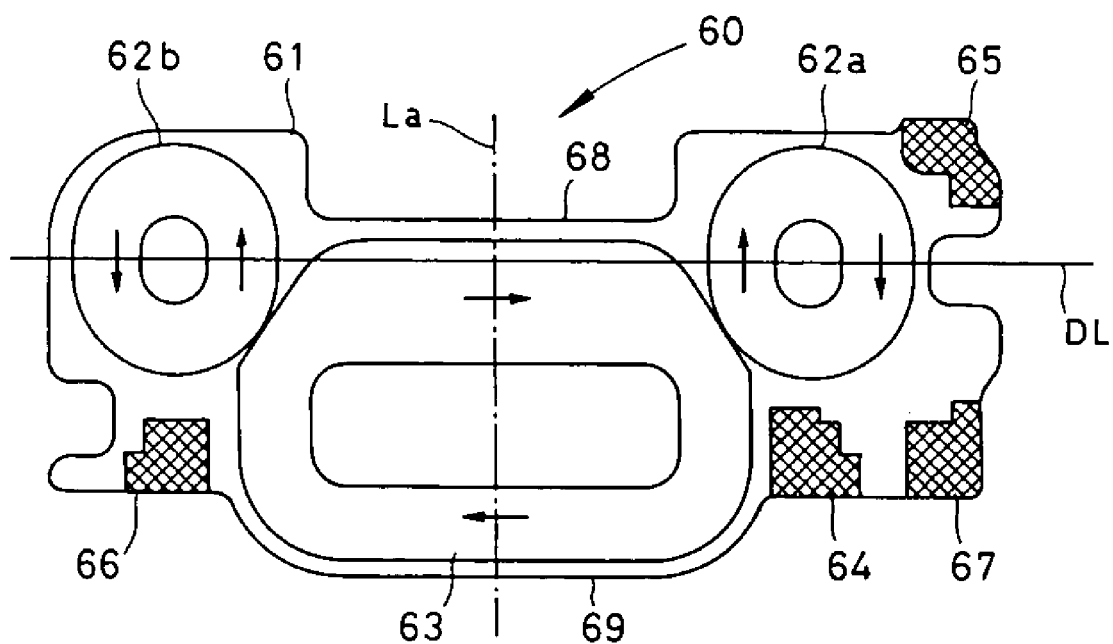
FIG. 8 is a structural diagram of a printed circuit board B coil forming the moving unit.

With reference to FIGS. 7 and 8, here will be described the structures of the printed circuit board A coil 50 and the printed circuit board B coil 60 for the drive coils to construct the moving unit 130. Here, the printed circuit board A coil 50 shown in FIG. 7 is fixed on the front side face Sf of the lens holder 30 so that coils and terminals to be described are formed on the side of the lens holder 30. In order to make this state easily understandable, therefore, a substrate 51 is shown in a perspective state. In other words, the coils and the terminals are formed on the same side on the back of the drawing. On the other hand, the printed circuit board B coil 60, as shown in FIG. 8, is fixed on the back side face Sb of the lens holder 30 so that the coils and the terminals are shown in the state where they are formed on the same side of this side of the drawing.

The printed circuit board A coil 50 is formed by plating the flat substrate 51 with copper to form the coils, the wires and so on in a pattern, as shown in FIG. 7. There are formed on the same face a tracking A coil 52a, a tracking B coil 52b, a focusing A coil 53, and four terminal parts (i.e., a tracking A input terminal part 54, a tracking A output terminal part 55, a focusing A input terminal part 56 and a focusing A output terminal part 57) made of a copper foil. The tracking A coil 52a and the tracking B coil 52b are arranged over the substrate 51 and formed symmetrically with respect to an optical axis La to have the same shape. On the other hand, the focusing A coil 53 is located at its center on the optical axis La and is formed below a line of action DL joining the centers of the tracking A coil 52a and the tracking B coil 52b. On the other hand, the substrate 51 is cut away at its upper portion to form a notch 58 and is protruded downward to form a bulge 59 so as to bear the later-described counter weight of the moving unit 130.

Here will be described the method of connecting the printed circuit board A coil 50. The tracking A coil 52a, as connected with the tracking A input terminal part 54, is turned counter-clockwise from the outer periphery to the inner periphery and is connected through a through hole and a copper foil, although not shown, with the tracking B coil 52b. This tracking B coil 52b is turned clockwise from the inner periphery to the outer periphery and is connected with the tracking A output terminal part 55. Therefore, the tracking A coil 52a and the tracking B coil 52b are connected in series between the tracking A input terminal part 54 and the tracking A output terminal part 55.

On the other hand, the focusing A coil 53, as connected with the focusing A input terminal part 56, is turned clockwise from the outer periphery to the inner periphery and is connected with the through hole and the copper foil with the focusing A output terminal part 57.

On the other hand, the printed circuit board B coil 60, as shown in FIG. 8, is formed like the printed circuit board A coil 50 by plating the flat substrate 51 with copper to form the coils, the wires and so on in a pattern. There are formed on the same face a tracking C coil 62a, a tracking D coil 62b, a focusing B coil 63, and four terminal parts (i.e., a tracking B input terminal part 64, a tracking B output terminal part 66, a focusing B input terminal part 66 and a focusing b output terminal part 67) made of a copper foil. The tracking C coil 62a and the tracking D coil 62b are arranged over the substrate 61 and formed symmetrically with respect to an optical axis La to have the same shape. On the other hand, the focusing B coil 63 is located at its center on the optical axis La and is formed below a line of action DL joining the centers of the tracking C coil 62a and the tracking D coil 62b. Like the printed circuit board A coil 50, the substrate 61 is cut away at its upper portion to form a notch 68 and is protruded downward to form a bulge 69.

Here will be described the method of connecting the printed circuit board B coil 60. The tracking C coil 62a, as connected with the tracking B input terminal part 64, is turned clockwise from the outer periphery to the inner periphery and is connected through a through hole and a copper foil, although not shown, with the tracking D coil 62b. This tracking D coil 62b is turned counter-clockwise from the inner periphery to the outer periphery and is connected with the tracking B output terminal part 65. Therefore, the tracking C coil 62a and the tracking D coil 62b are connected in series between the tracking B input terminal part 64 and the tracking B output terminal part 65.

On the other hand, the focusing B coil 63, as connected with the focusing B input terminal part 66, is turned clockwise from the outer periphery to the inner periphery and is connected with the through hole and the copper foil with the focusing B output terminal part 67.

Figure 9:
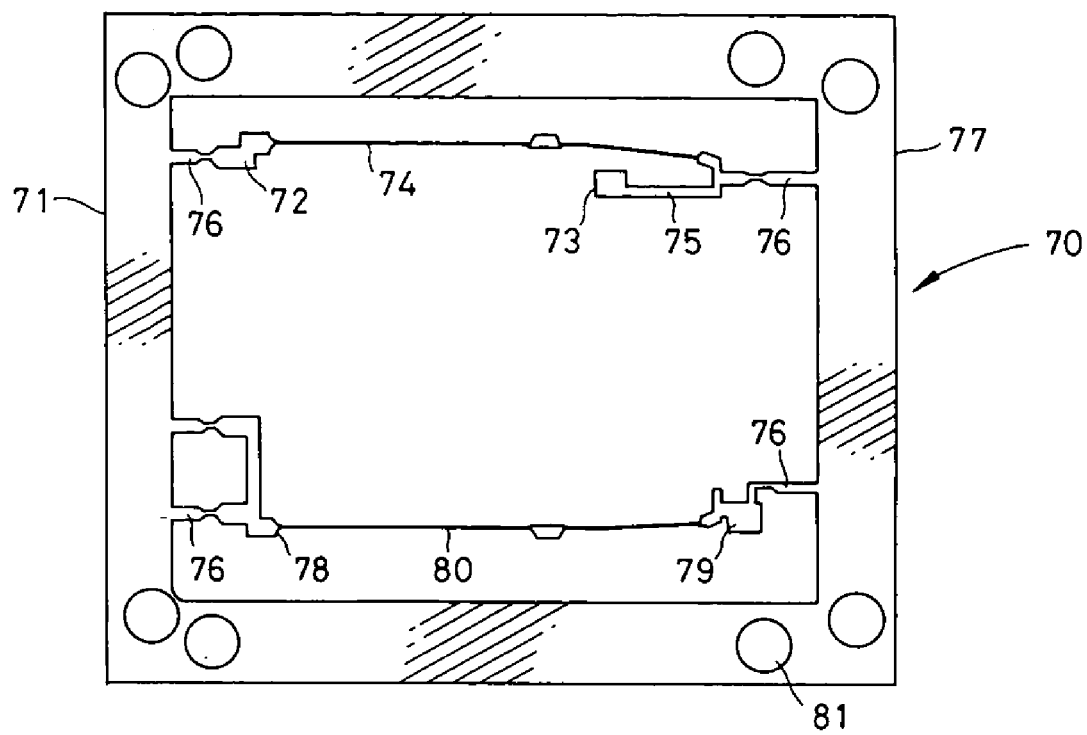
FIG. 9 is a structural diagram of an upper suspension frame to be used in the moving unit.
Figure 10:
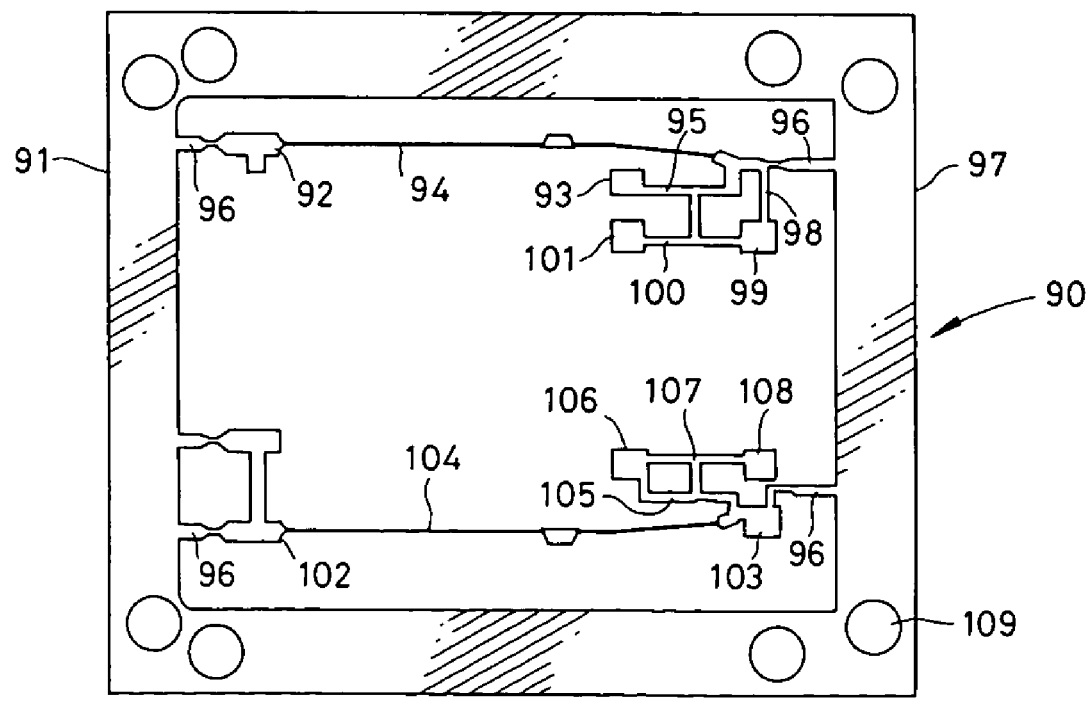
FIG. 10 is a structural diagram of a lower suspension frame to be used in the moving unit.

With reference to FIGS. 9 and 10, here will be described the structures of the four wire-form elastic members 74, 80, 94 and 104 which are insert-molded when the lens holder 30 and the acatuator base 40 are moulded out of a resin. Here, FIG. 9 is a top plan view of an upper suspension frame 70 which is formed to have the two wire-form elastic members 74 and 80 and the individual connecting parts by punching out the unnecessary portions from a flat metal plate by press work. FIG. 10 is a top plan view of an upper suspension frame 90 which is formed to have the two wire-form elastic members 94 and 104 and the individual connecting parts by punching out the unnecessary portions from a flat metal plate by press work.

Here, the upper suspension frame 70 is arranged on the side of the top face 31 of the lens holder 30, when it is molded integrally with the lens holder 30, and bears a tracking input terminal 72 and a tracking output terminal 78, as will be described. On the other hand, the lower suspension frame 90 is arranged on the side of the bottom face 33 of the lens holder 30, when it is molded integrally with the lens holder 30, and bears a focusing input terminal 92 and a focusing output terminal 102, as will be described.

The upper suspension frame 70 and the lower suspension frame 90 are given the function of a suspension and a wiring function to feed the drive currents to the printed circuit board coils 50 and 60 so that they are formed of metal sheets 71 and 91 having an elastic force and an excellent conductivity and made of a thin sheet (e.g., about 0.1 mm) of titanium-copper, phosphor bronze or beryllium-copper. These metal plates 71 and 91 are made of a long hoop material and are formed by punching work using a die such that the four wire-form elastic members 74, 80, 94 and 104 and the individual connecting parts are connected to a frame member 77 by a plurality of holding members 76. These metal plates 71 and 91 are provided in plurality at a predetermined pitch while considering the productivity.

In the upper suspension frame 70, as shown in FIG. 9, the tracking input terminal 72, as insert-molded in the actuator base 40, and a tracking A input connecting part 73, as insert-molded in the lens holder 30, are jointed by the wire-form elastic member (or the outer periphery A wire) 74 and an A coupling member 75 and are held on the frame member 77 by the holding member 76. On the other hand, the tracking output terminal 78, as insert-molded in the upper suspension frame 70, and a tracking B output connecting part 79, as insert-molded in the lens holder 30, are jointed by the wire-form elastic member (or the inner periphery A wire) 80 and are held on the frame member 77 by the holding member 76. Here in the frame member 77 of the upper suspension frame 70, there are formed a plurality of fixing holes 81 for fixing the upper suspension frame 70 precisely at a predetermined position of a mold to be described.

In the lower suspension frame 90, as shown in FIG. 10, the focusing input terminal 92, as insert-molded in the actuator base 40, and a focusing A input connecting part 93, as insert-molded in the lens holder 30, are jointed by the wire-form elastic member (or the outer periphery B wire) 94 and a B coupling member 95 and are held on a frame member 97 by a holding member 96. A focusing B input terminal part 99, as jointed to the outer periphery B wire 94 by a C coupling member 98, is jointed to a focusing B output connecting part 101 by a D coupling member 100.

On the other hand, the focusing output terminal 102, as insert-molded in the actuator base 40, and a focusing B output connecting part 103, as insert-molded in the lens holder 30, are jointed by the wire-form elastic member (or the inner periphery B wire) 104 and are held on the frame member 97 by the holding member 96. A tracking A output connecting part 106 is jointed to the inner periphery B wire 104 by an E coupling member 105, and a tracking B input connecting part 108 is jointed to the tracking A output connecting part 106 by an F coupling member 107. In the frame member 97 of the lower suspension frame 90, on the other hand, there are formed a plurality of fixing holes 109 as in the upper suspension frame 70.

The upper suspension frame 70 and the lower suspension frame 90 are made of the metal plates 71 and 91 having an equal thickness (H), and the outer periphery A wire 74 and the outer periphery B wire 94 of the lower suspension frame 90 are formed at the same position with respect to the frame members 77 and 97 to have an equal width (Wo). On the other hand, the inner periphery B wire 80 of the upper suspension frame 70 and the inner periphery B wire 104 of the lower suspension frame 90 are formed at the same position with respect to the frame members 77 and 97 to have an equal width (Wi)l. As will be described in detail, moreover, the width (Wo) of the outer periphery A wire 74 of the upper suspension frame 70 and the outer periphery B wire 94 of the lower suspension frame 90 is made smaller than the width (Wi) of the inner periphery B wire 80 of the upper suspension frame 70 and the inner periphery B wire 104 of the lower suspension frame 90. There have been described the structures of the individual components of the actuator unit 140.

Figure 11:
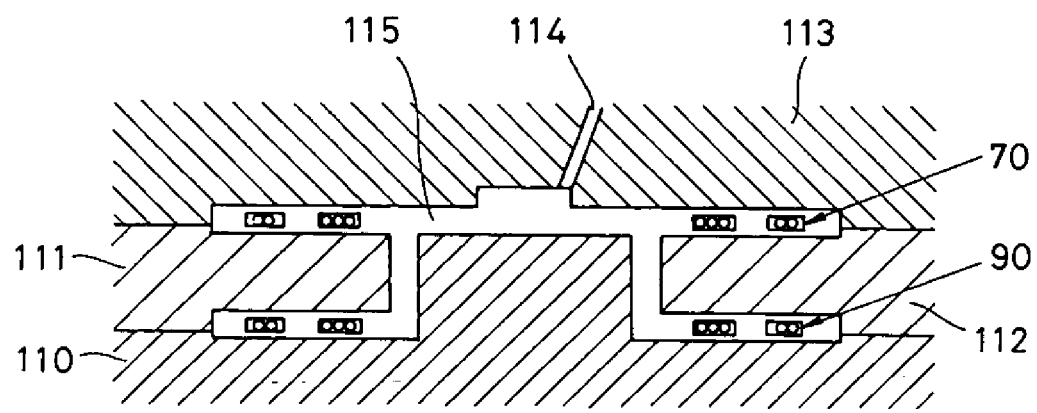
FIG. 11 is a structural diagram of an essential portion of a mold for molding the suspension unit.

The method for manufacturing the actuator unit 140 will be described with reference to FIG. 11 to FIGS. 16A to 16C. With reference to FIG. 11, first of all, here will be described a mold structure and a resin molding procedure to be used for molding the lens holder 30 and the actuator base 40 integrally by using the upper suspension frame 70 and the lower suspension frame 90. Here, the mold is formed to have an integral space outside the resin parts of the lens holder 30 and the actuator base 40. For the simplicity of the description, FIG. 11 is a structural diagram of an essential portion of the mold and shows only the portion of the lens holder 30, but the detail is omitted.

The mold is composed of four parts of a lower stationary part 110, a pair of left and right movable parts 111 and 112, and an upper movable part 113, and is provided with a sprue 114, through which the resin is poured into the upper movable part 113. First of all, the lower suspension frame 90 is fixed in the mold.

The lower suspension frame 90 is fixed at a predetermined position in the lower stationary part 110 of the mold. This lower stationary part 110 is provided with the not-shown positioning pins so that the lower suspension frame 90 is precisely positioned with respect to the lower stationary part 110 by bringing the fixing holes 109 of the lower suspension frame 90 onto those positioning pins. Next, the left movable part 111 and the right movable part are placed at a predetermined position of the lower stationary part 110 while clamping the lower suspension frame 90. Next, the upper suspension frame 70 is fixed at predetermined positions of the left movable part 111 and the right movable part 112. Like the lower stationary part 110, the left movable part 111 or the right movable part 112 is provided with the not-shown positioning pins so that the upper suspension frame 70 is precisely positioned with respect to the left movable part 111 and the right movable part 112 by bringing the fixing holes 81 of the upper suspension frame 70 onto those positioning pines. Finally, the upper movable part 113 is placed on the left movable part 111 and the right movable part 113 while clamping the upper suspension frame 70. Thus, the upper suspension frame 70 and the lower suspension frame 90 are fitted in the mold to form a resin space 115 for the lens holder 30 while enclosing the upper suspension frame 70 and the lower suspension frame 90. These operations belong to a first step of the manufacture method.

Figure 12:
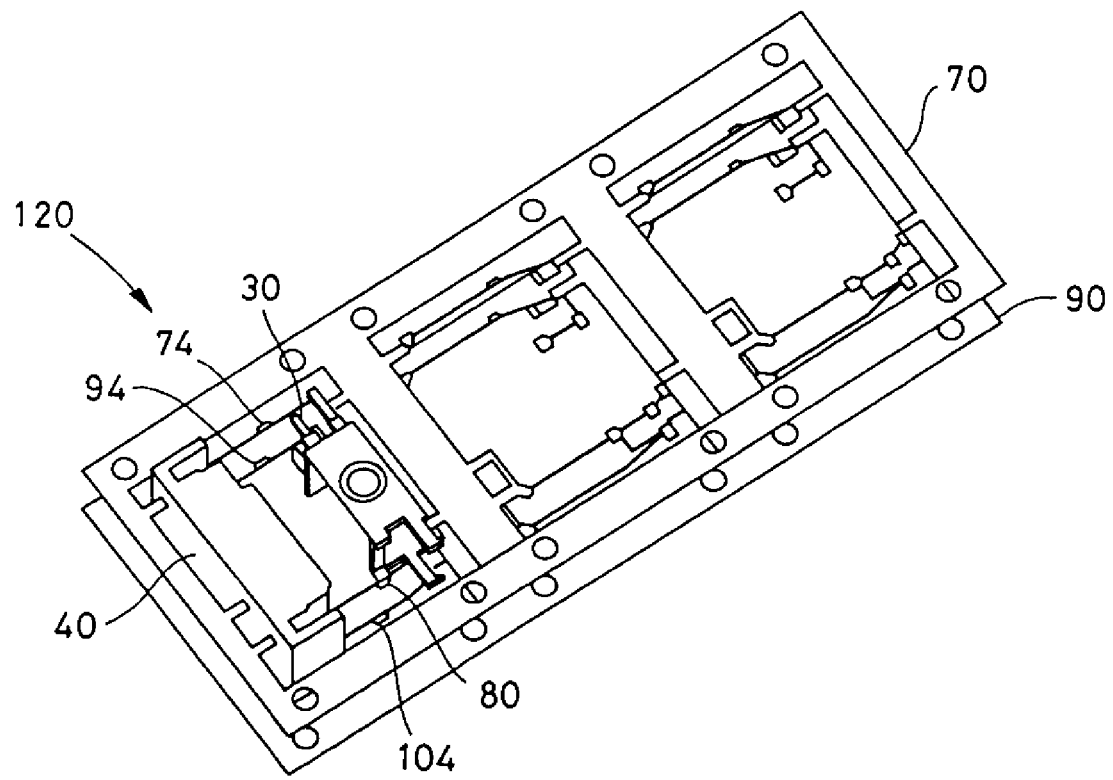
FIG. 12 is a perspective view showing a delivery shape of the suspension unit.

Next, the resin space 115 is charged with the resin through the sprue 114. When the resin is set to complete the lens holder 30 and the actuator base 40, the mold is disassembled in the procedure, as reversed from that of the mold assembling procedure thus far described. At this time, the left movable part 111 and the right movable part 112 are taken out by sliding them to the left and right. These left and right movable parts 111 and 112 are once fixed while being slid in the left and right directions, and are taken out after a damping material of an ultraviolet-set resin is applied to the grooves 43a and 43b formed in the two side faces of the actuator base 40. FIG. 12 shows the state in which the upper suspension frame 70 and the lower suspension frame 90 are removed from the aforementioned mold. There are completed suspension units 120 which are formed in plurality in a ladder shape and in which the lens holder 30 and the actuator base 40 are molded integrally with the upper suspension frame 70 and the lower suspension frame 90.

Here will be described a third step in the manufacture method of connecting the individual terminals of the printed circuit board A coil 50 and the printed circuit board B coil 60 (as will be called the "two printed circuit board coils 50 and 60"), as fixed on the lens holder 30, the four wire-form elastic members 74, 80, 94 and 104, as fixed on the lens holder 30, and their connecting parts are connected. Before entering into this description, here will be described with reference to FIGS. 13 and 14 the steps of cutting the adjoining frame members 77 and 97 of the upper suspension frame 70 and the lower suspension frame 90 and cutting off the unnecessary portions.

Figure 13:
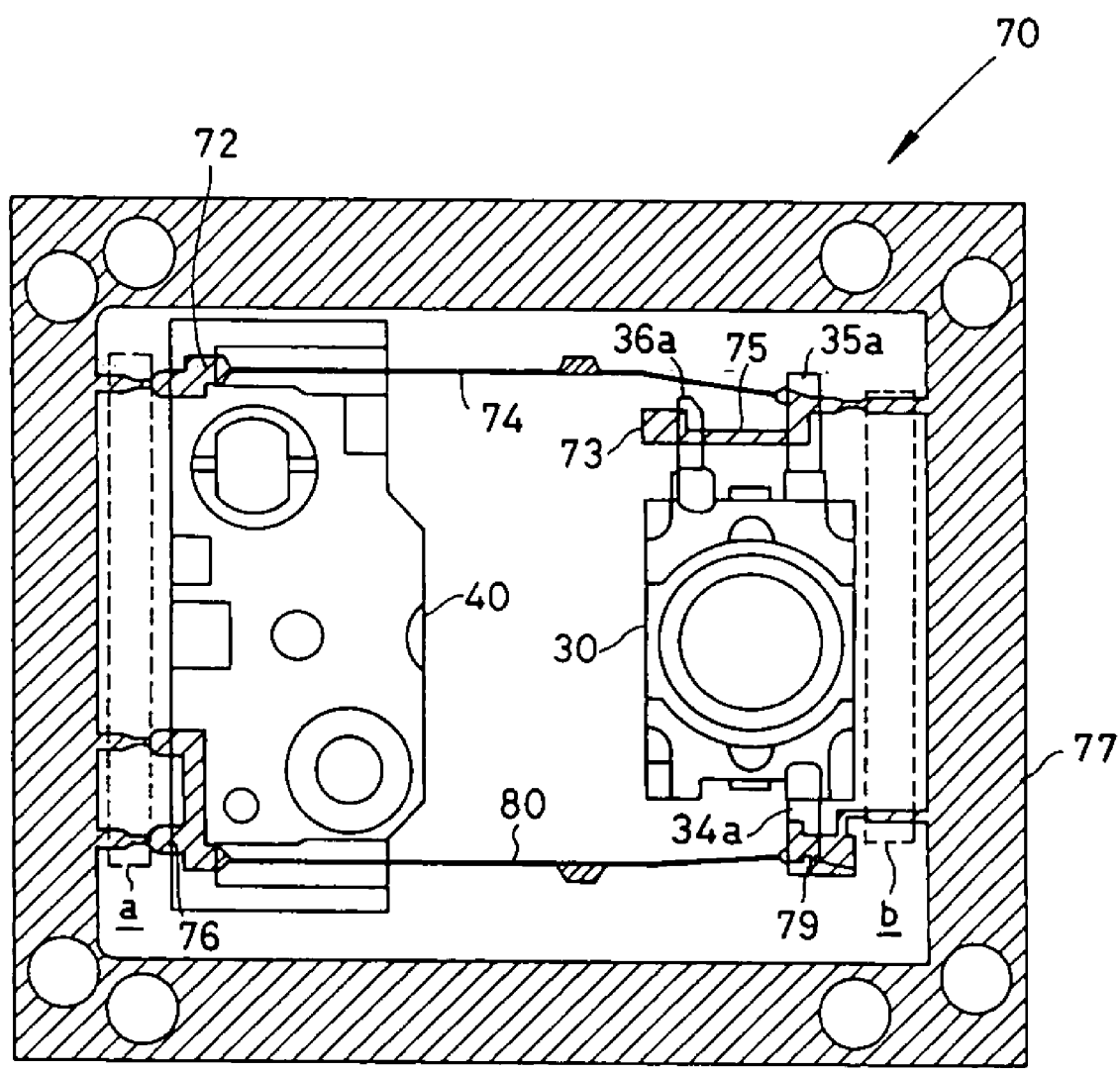
FIG. 13 is a diagram showing a cut portion of the upper suspension frame in which a lens holder and a suspension base are integrally molded.
Figure 14:
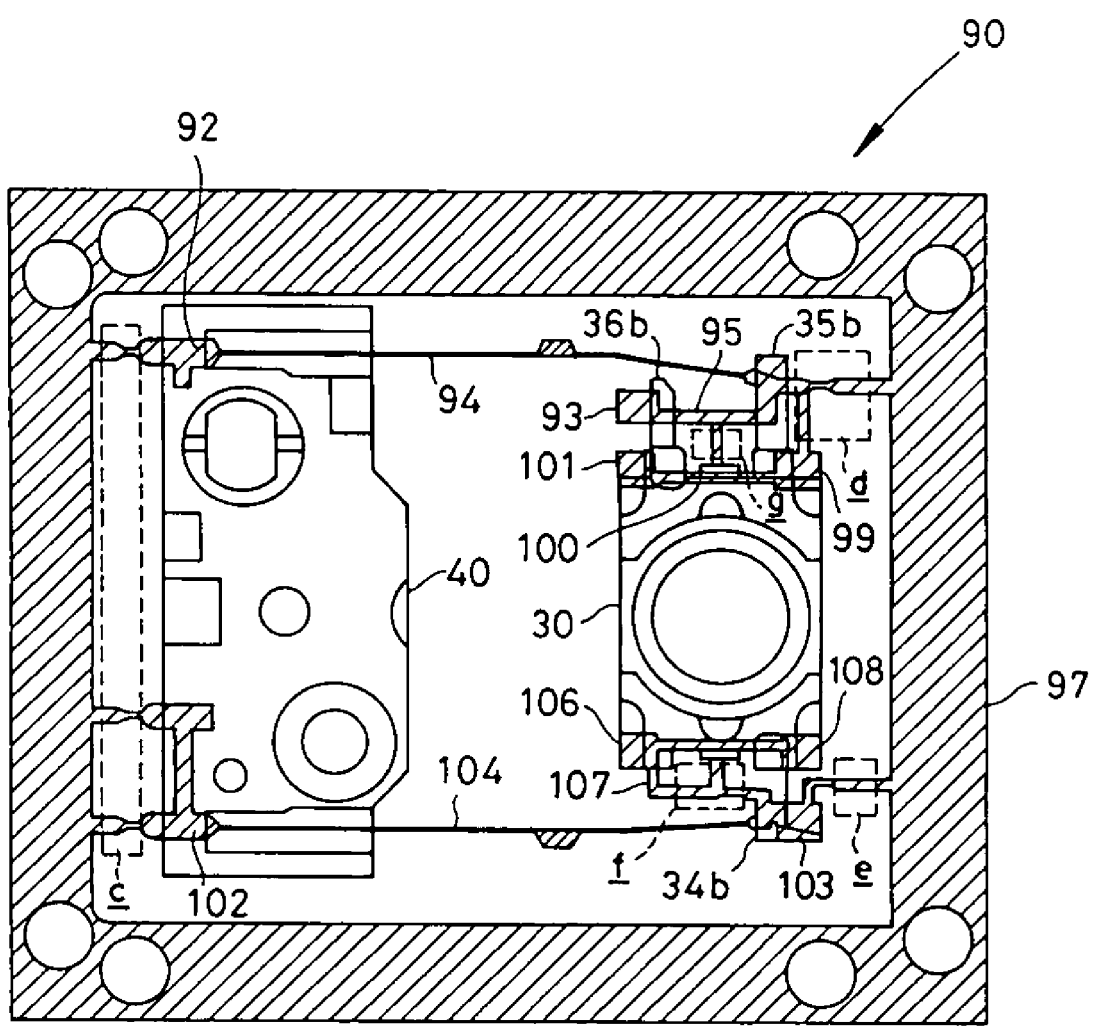
FIG. 14 is a diagram showing a cut portion of the lower suspension frame in which a lens holder and a suspension base are integrally molded.

FIG. 13 is a perspective top plan view showing the state in which the lens holder 30 and the actuator base 40 are molded integrally with the upper suspension frame 70. The lens holder 30 is shown to include the paired left and right fixing arms 34a and 35a formed on the side of the top face 31, and the projecting portions 36a. As shown in FIG. 13, the outer periphery A wire 74, the inner periphery A wire 80 and the individual coupling members are fixed such that they are partially enveloped by the resin but such that the leading end portions of the individual connecting parts are exposed from the resin. On the other hand, FIG. 14 is a perspective top plan view showing the state in which the lens holder 30 and the actuator base 40 are molded integrally with the lower suspension frame 90. The lens holder 30 is shown to include the paired left and right fixing arms 34b and 35b formed on the side of the bottom face 33, and the projecting portions 36b. As shown in FIG. 14, the outer periphery B wire 94, the inner periphery B wire 104 and the individual coupling members are fixed such that they are partially enveloped by the resin but such that the leading end portions of the individual connecting parts are exposed from the resin.

The upper suspension frame 70 and the lower suspension frame 90 are cut away, by removing the portions indicated by the frames of the dotted lines, from the frame members 77 and 97 to form the suspension unit 120, such that the lens holder 30 and the actuator base 40 are jointed to the four wire-form elastic members 74, 80, 94 and 104.

The upper suspension frame 70 is cleared of the two dotted-line frames a and b, as shown in FIG. 13, by a laser-cutting or punching treatment. The outer periphery A wire 74, as connected to the tracking input terminal 72 molded integrally with the actuator base 40 and cut away from the frame member 77, is cut away from the frame member 77 and is fixed on the fixing arm 35a of the lens holder 30, and the tracking A input connecting part 73, as jointed by the A coupling member 75, is fixed on the projecting portion 36a while being exposed to the front side face of the lens holder 30. On the other hand, the inner periphery A wire 80, as connected to the tracking output terminal 76 molded integrally with the actuator base 40 and cut away from the frame member 77, is cut away from the frame member 77 and is fixed on the fixing arm 34a of the lens holder 30, and the tracking B output connecting part 79, as connected with the inner periphery A wire 80, is fixed while being exposed to the back side face of the lens holder 30.

From the lower suspension frame 90, on the other hand, five portions, as indicated by dotted-line frames c to g in FIG. 14, are removed by a similar method. The outer periphery B wire 94, as connected with the focusing input terminal 92 molded integrally with the actuator base 40 and cut away from the frame member 97, is cut away from the frame member 97 and is fixed on the fixing arm 35*b* of the lens holder 30, and the focusing A input connecting part 93, as jointed at the B coupling member 95, is fixed on the projecting portion 36*b* while being exposed to the front side face of the lens holder 30. On the other hand, the focusing B input connecting part 99, as cut away from the outer periphery B wire 94, is fixed while being exposed to the back side face of the lens holder 30, and the focusing B output connecting part 101, as jointed to the focusing B input connecting part 99 at the D coupling member 100, is fixed while being exposed to the front side face of the lens holder 30.

On the other hand, the inner periphery B wire 104, as connected with the focusing output terminal 102 molded integrally with the actuator base 40 and cut away from the frame member 97, is cut away from the frame member 97 and is fixed on the fixing arm 34*b* of the lens holder 30, and the focusing B output connecting part 103, as connected with the inner periphery 13 wire 104, is fixed while being exposed to the back side face of the lens holder 30. On the other hand, the tracking B input connecting part 108, as cut away from the frame member 97, is fixed while being exposed to the back side face of the lens holder 30, and the tracking A output connecting part 106, as connected with the tracking B input connecting part 108 at the F coupling member 107, is fixed while being exposed to the front side face of the lens holder 30.

Figure 15:
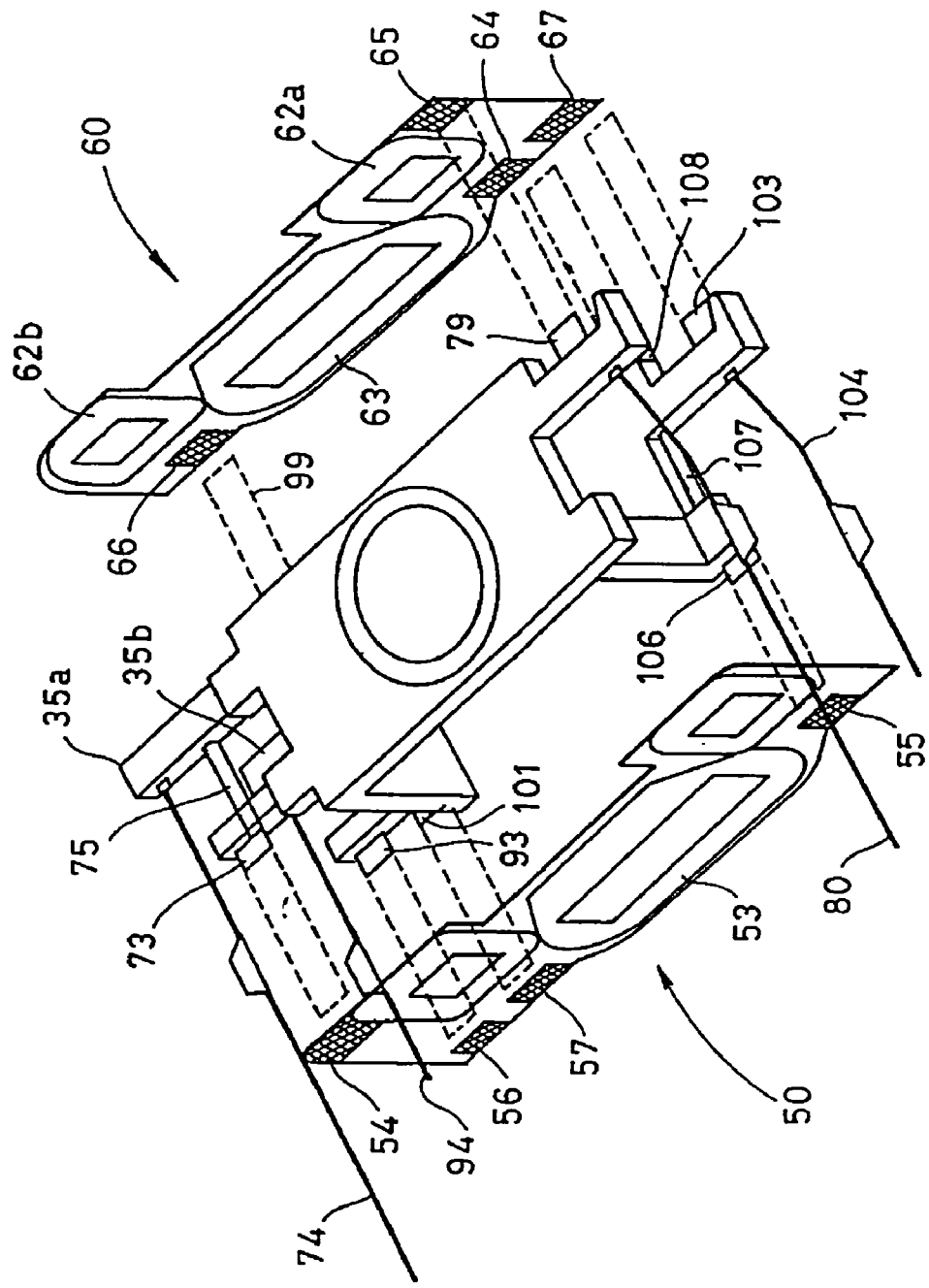
FIG. 15 is a perspective view of a structure when a printed circuit board coil is connected with the suspension unit.

With reference to FIG. 15, here will be described the third step in the aforementioned manufacture method for connecting the lens holder 30 and the two printed circuit board coils 50 and 60. In order that the structures of the portions to be soldered may be easily understood, FIG. 15 shows the state in which the printed circuit board A coil 50 and the printed circuit board B coil 60 are arranged at positions apart from the two side faces of the lens holder 30 and in which the individual connecting parts molded integrally with the lens holder 30 are schematically extended (as indicated by dotted lines).

The individual connecting parts of the lens holder 30 having the objective lens 37 held therein are formed in positional relations to contact with the individual terminals formed at the printed circuit board A coil 50 and the printed circuit board B coil 60 being fixed at predetermined positions of the lens holder 30.

As shown in FIG. 15, more specifically, the four terminal portions (i.e., the tracking A input terminal part 54, the tracking A output terminal part 55, the focusing A input terminal part 56 and the focusing A output terminal part 57) of the printed circuit board A coil 50 are in the positional relations to abut against the end faces of the four connecting parts (i.e., the tracking A input connecting part 73, the focusing A input connecting part 93, the focusing B output connecting part 101) and the tracking A output connecting part 106) which are formed while being fixed at the predetermined positions of the front side face of the lens holder 30 and exposed to the front side face of the lens holder 30. On the other hand, the four terminal portions (i.e., the tracking b input terminal part 64, the tracking B output terminal part 65, the focusing B input terminal part 66 and the focusing B output terminal part 67) of the printed circuit board B coil 60 are in the positional relations to abut against the end faces of the four connecting parts (i.e., the tracking B input connecting part 79, the focusing B input connecting part 99, the focusing B output connecting part 103 and the tracking B input connecting part 108) which are formed while being exposed to the back side face of the lens holder 30. Therefore, these are soldered to form the actuator unit 140.

The outer periphery A wire 74, as connected with the tracking input terminal 72, is connected through the A coupling member 75 with the tracking A input terminal part 54, and the tracking A input terminal part 54 is soldered to the tracking A input terminal part 54 of the printed circuit board A coil 50. On the other hand, the tracking A output terminal part 55 of the printed circuit board A coil 50 is soldered to the tracking A output connecting part 106 of the lens holder 30, and the tracking B input connecting part 108 of the lens holder 30, as jointed to the tracking A output connecting part 106 at the F coupling member 107, is soldered to the tracking B input terminal part 64 of the printed circuit board B coil 60. On the other hand, the inner periphery A wire 80, as connected with the tracking output terminal 78, is connected with the tracking B output connecting part 79, and the tracking B output connecting part 79 is soldered to the tracking B output terminal part 65 of the printed circuit board B coil 60.

As described above, the tracking A coil 52*a* and the tracking B coil 52*b* of the printed circuit board A coil 50 are connected in series between the tracking A input terminal part 54 and the tracking A output terminal part 55, and the tracking C coil 62*a* and the tracking D coil 62*b* of the printed circuit board B coil 60 are connected in series between the tracking B input terminal part 64 and the tracking B output terminal part 65. Therefore, the four tracking coils 52*a*, 52*b*, 62*a* and 62*b* are connected in series between the tracking input terminal 72 and the tracking output terminal 78.

On the other hand, the outer periphery B wire 94, as connected with the focusing input terminal 92, is connected through the B coupling member 95 with the focusing A input terminal part 93, and the focusing A input terminal part 93 is soldered to the focusing A input terminal part 56 of the printed circuit board A coil 50. On the other hand, the focusing A output terminal part 57 of the printed circuit board A coil 50 is soldered to the focusing A output connecting part 101 of the lens holder 30, and the focusing B input connecting part 99 of the lens holder 30, as connected with the tracking A output connecting part 101 at the C coupling member 100, is soldered to the focusing B input terminal part 66 of the printed circuit board B coil 60. On the other hand, the inner periphery B wire 104, as connected with the focusing output terminal 102, is connected with the focusing B output connecting part 103, and the focusing B output connecting part 103 is soldered to the focusing B output terminal part 67 of the printed circuit board B coil 60.

As described above, the focusing A coil 53 of the printed circuit board A coil 50 is connected between the focusing A input terminal part 56 and the focusing A output terminal part 57, and the focusing B coil 63 of the printed circuit board B coil 60 is connected between the focusing B input terminal part 66 and the focusing B output terminal part 67. Therefore, the focusing A coil 53 and the focusing B coil 63 are connected in series between the focusing input terminal part 94 and the focusing output terminal part 104. These operations belong to the third step of the manufacture method.

The actuator unit 140 to be used in the pickup device 200 thus far described according to the embodiment of the invention need not be connected with the outside by using any wiring material, because the four wire-form elastic members 74, 80, 94 and 104 are molded integrally with the lens holder 30 and the actuator base 40 and because the individual coupling members for connecting the printed circuit board A coil 50 and the printed circuit board B coil 60 are integrally molded. Therefore, the working steps are simplified to provide the highly reliable actuator unit 140.

Figure 16A:
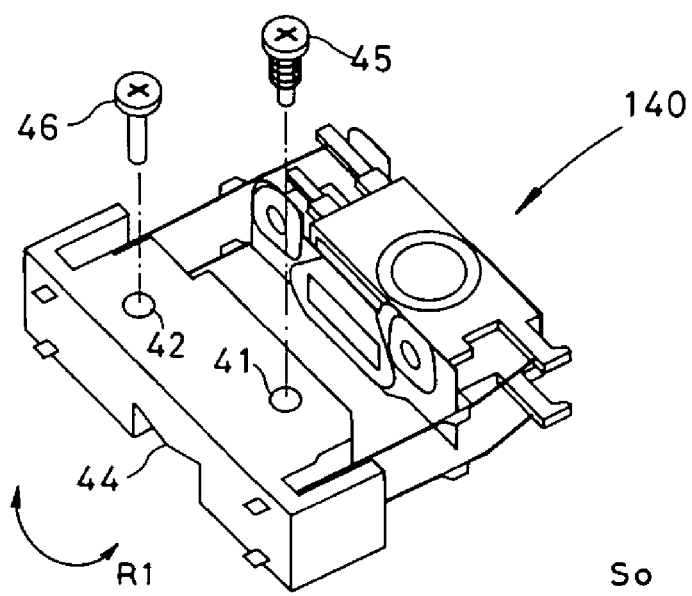
FIGS. 16a to 16C are diagrams showing a procedure for assembling the actuator unit is assembled in the suspension base.
Figure 16B:
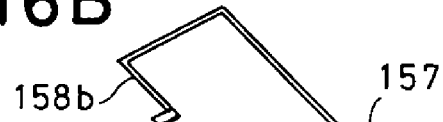
Figure 16C:
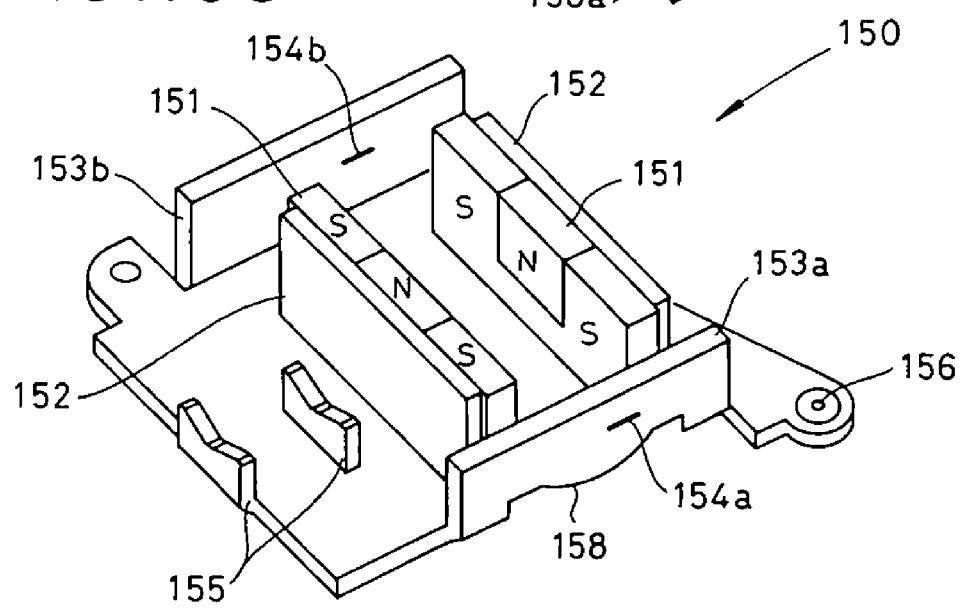

With reference to FIGS. 16A to 16C, here will be described the procedure for assembling the actuator unit 140 in the suspension base 150. FIG. 16A is a perspective view of the actuator unit 140; FIG. 16B is a perspective view of a stopper member 157; and FIG. 16C is a perspective view of the suspension base 150.

As has been described hereinbefore, the actuator unit 140 is fixed after the V-shaped grooves 44 of the actuator base 40 were placed on the two M-shaped projecting plates 155 of the suspension base 150 and positionally adjusted by a screw 45 with a spring and a fixing screw 46. As a result, the moving unit 130 is supported movably while forming a predetermined magnetic space with respect to the paired magnets 151. After this, the stopper members 157 are inserted into insert holes 154 of the paired upright portions 153 formed to enclose the moving unit 130.

The stopper member 157 is the wire-form member which is folded generally in a C-shape as a whole, as shown in FIG. 16B, and is provided at the leading ends of the C-shaped body with restricting portions 158a and 158b projecting to the inner sides of the upright portions 153, i.e., on the side of the moving unit 130. The stopper member 157 is made of an elastic member having a spring effect so that the leading ends of the two restricting portions 158a and 158b may be inserted from the outer sides of the upright portions 153 when the stopper member 157 is to be inserted into the insert holes 154 of the upright portions 153.

The actuator unit 140, as placed on the suspension base 150, is restricted in the moving range of the moving unit 130 in the tracking direction by the paired upright portions 153 disposed to enclose the moving unit 130 and in the moving range of the moving unit 130 in the focusing direction by the stopper member 157.

Figure 17A:
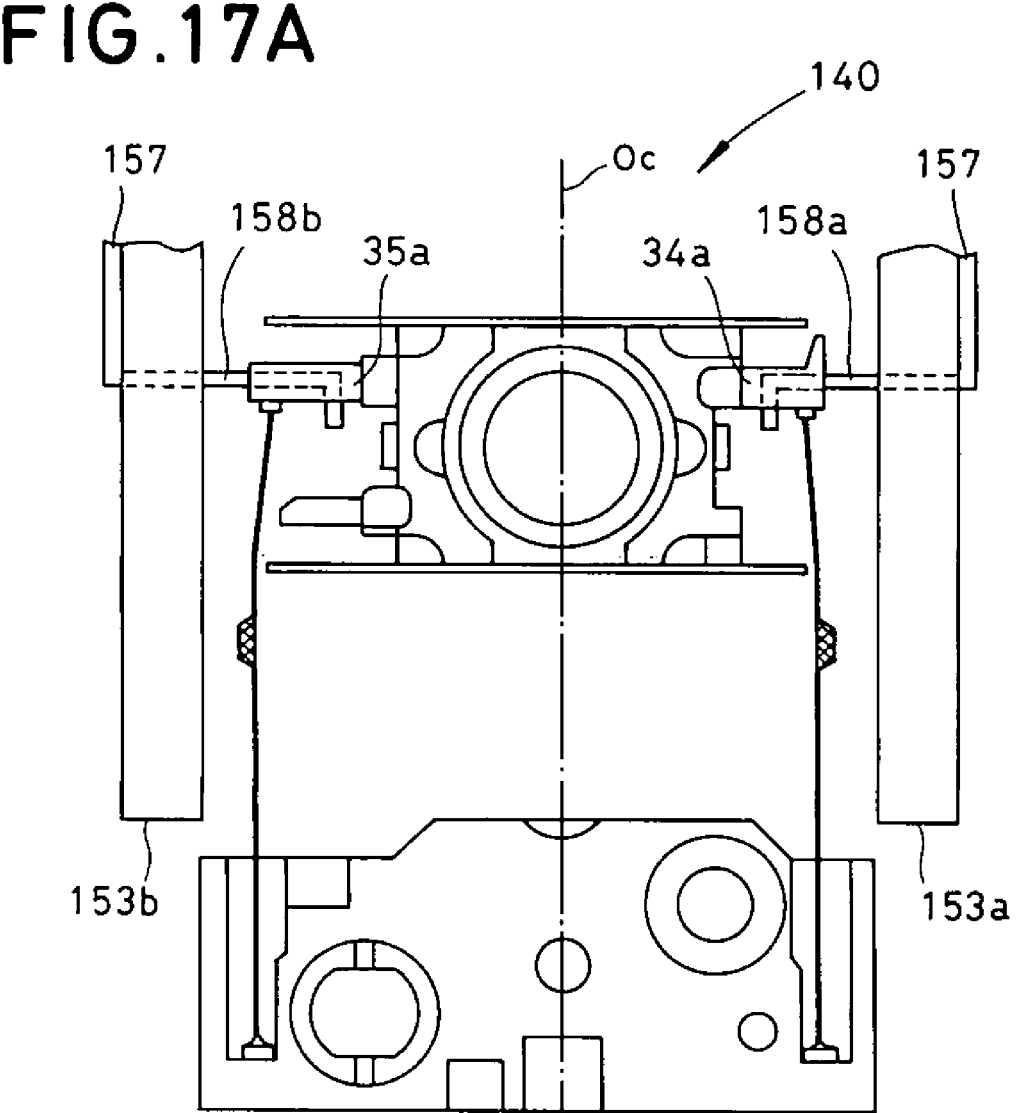
FIGS. 17A and 17B are diagrams for explaining the function of a stopper member.

These restrictions will be specifically described with reference to FIGS. 17A and 17B. FIG. 17A is a top plan view showing the positional relation between the upright portions 153 and the stopper member 157 of the suspension base 150, and FIG. 17B is a side elevation showing the positional relations among the lens holder 30 holding the objective lens 37, the upright portions 153 and the stopper member 157.

Figure 17B:
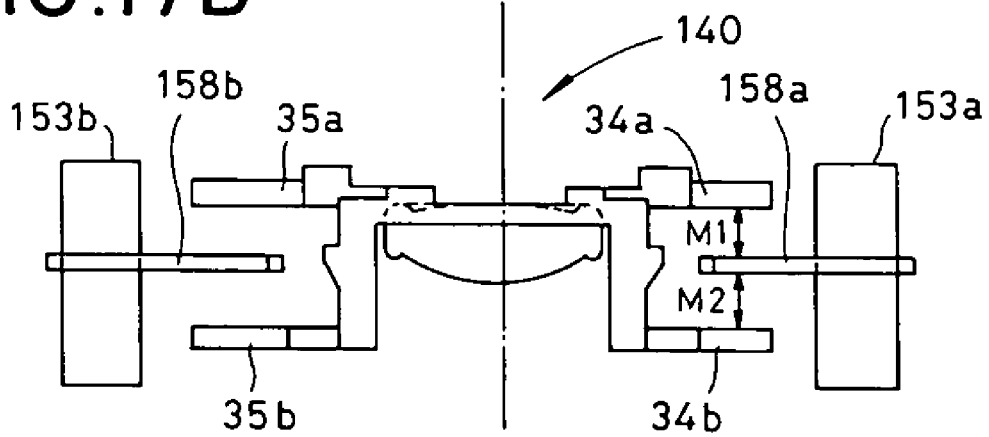

As the stopper member 157 is inserted into the insert holes 154 of the upright portions 153, as shown in FIGS. 17A and 17B, one restricting portion 158a of the stopper member 157 is arranged at the central portions of the fixing arms 34a and 34b which are spaced in the focusing direction in the lens holder 30, and the other restricting portion 158b of the stopper member 157 is arranged at the central portion of the other fixing arms 35a and 35b which are spaced in the focusing direction in the lens holder 30. Where the moving unit 130 is driven in the upward focusing direction, therefore, it is restricted in its moving range by the distance M2 in which the left and right fixing arms 34b and 35b formed on the side of the bottom face 33 of the lens holder 30 come into abutment against the restricting portions 158a and 158b. Where the moving unit 130 is driven in the downward focusing direction, on the other hand, it is restricted in its moving range by the distance M1 in which the left and right fixing arms 34a and 34b formed on the side of the top face 31 of the lens holder 30 come into abutment against the restricting portions 158a and 158b. Thus, the fixing arms 35a and 35b or the stationary portions of the elastic members are utilized as the mechanism for restricting the moving ranges of in the focusing directions so that the cost is lowered.

Figure 18:
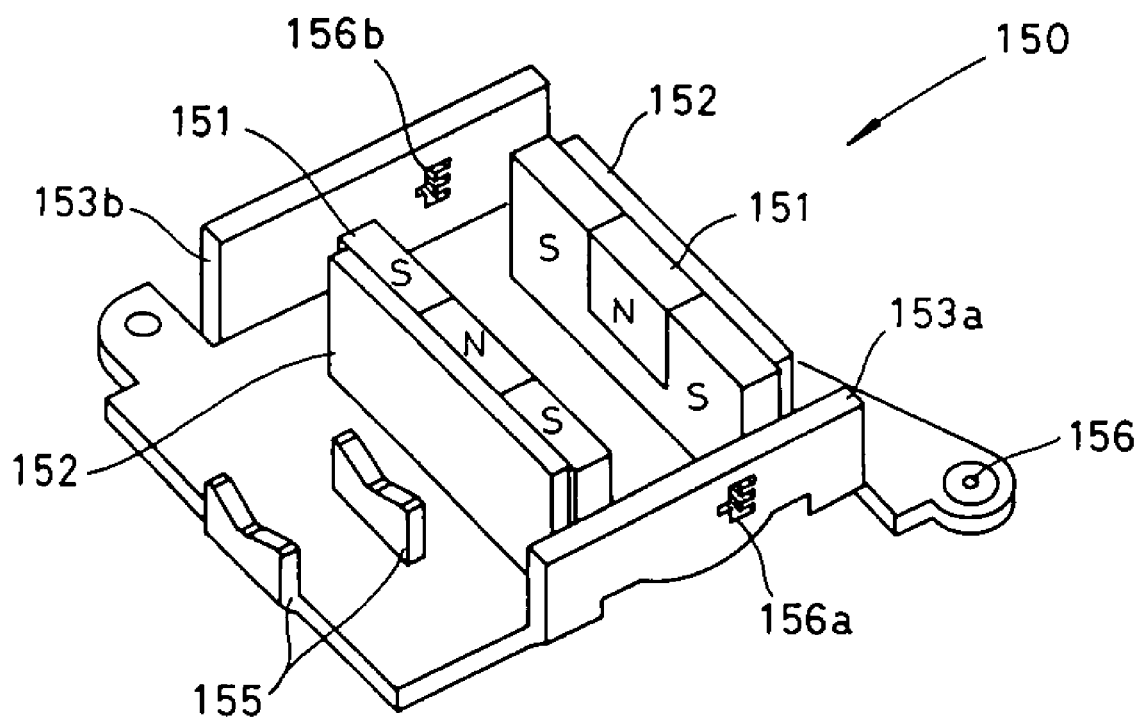
FIG. 18 is a diagram showing another embodiment of the stopper member.

Here, the insert holes 154, as formed in the upright portions 153, may be exemplified by a pair of insert holes 156a and 156b having a plurality of insert positions, as shown in FIG. 18. With this construction, the upward moving range and the downward moving range of the moving unit 130 can be specified differently from each other to raise the versatility of the suspension base 150.

The actuator unit 140 is fixed on the suspension base 150, as has been described hereinbefore, the stopper member 157 is then inserted into the insert holes 154 of the upright portions 153. Moreover, the suspension base 150 is fixed on the pickup body 170 to complete the pickup device 200 according to the embodiment of the invention.

As has been described hereinbefore, the moving unit 130 constructing the pickup device 200 of the embodiment of the invention is restricted not only in the moving range in the tracking direction by the upright portions 153 of the suspension base 150 but also in the moving range in the focusing direction by the stopper member 157. Therefore, the pickup device 200 according to the embodiment of the invention does not need any actuator cover so that it can be made small and light.

Figure 19:
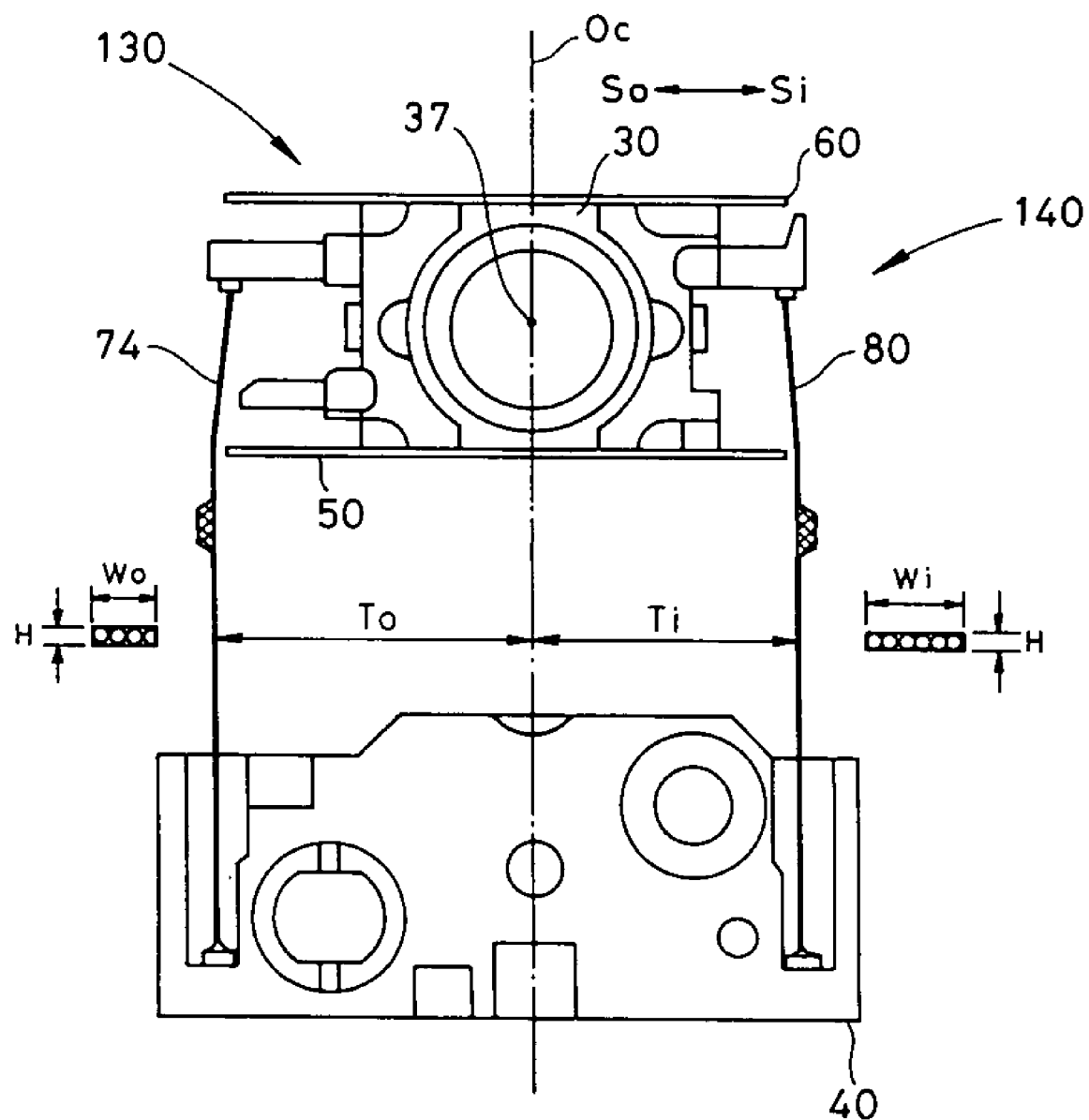
FIG. 19 is a diagram for explaining the suppression of an angular moment.
Figure 20:
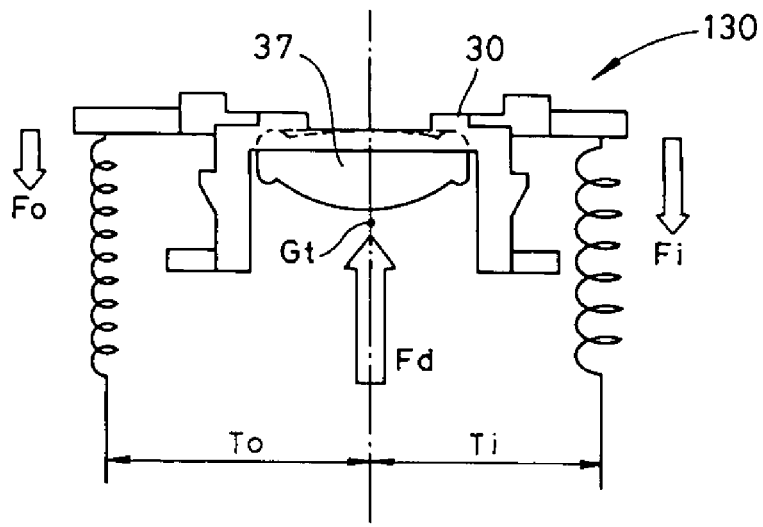
FIG. 20 is a diagram for explaining the suppression of an angular moment.

With reference to FIGS. 19 and 20, here will be described the constructions of the four wire-form elastic members 74, 80, 94 and 104 supporting the moving unit 130 and their actions to prevent the rolling of the moving unit 130. This moving unit 130 is actually supported by the four wire-form elastic members 74, 80, 94 and 104 but is shown to use only the outer periphery A wire 74 and the inner periphery A wire 80 so as to avoid complexity of the description. No difference in the actions will arise. FIG. 19 is a top plan view of the actuator unit 140, and FIG. 20 is a schematic diagram for explaining the angular moment of the moving unit 130.

In the pickup device 200 of the embodiment of the invention, as shown in FIG. 19, the distance Ti from the inner periphery A wire 80 for supporting the moving unit 130 to the optical center line Oc of the objective lens 37 is made smaller than the distance To from the outer periphery A wire 74 to the optical center line Oc of the objective lens 37, as has been described hereinbefore. Accordingly, the inner periphery A wire 80 and the outer periphery A wire 74 are formed to have the same thickness H, but the width Wi of the inner periphery A wire 80 is made larger than the thickness Wo of the outer periphery A wire 74 (i.e., Wi>Wo).

Therefore, the inner periphery A wire 80 has a spring constant Ki, as expressed by the following Formula (1):

$$Ki \propto Ti3H \qquad (1).$$

Likewise, the outer periphery A wire 74 has a spring constant Ko, as expressed by the following Formula (2):

$$Ko \propto To3H \qquad (2).$$

From the aforementioned relation Wi>Wo, therefore, the spring constant Ki of the inner periphery A wire 80 is larger than the spring constant Ko of the outer periphery A wire 74 (i.e., Ki>Ko).

If the deflection of the inner periphery A wire 80 and the outer periphery A wire 74 in the focusing direction when the moving unit 130 is displaced in the focusing direction by a drive force Fd is designated by x, on the other hand, the restoring force Fi of the inner periphery A wire 80 is expressed by the following Formula (3) when the moving unit 130 is displaced in the focusing direction, as shown in FIG. 19:

$$Fi = Kix \qquad (3).$$

Likewise, the restoring force Fo of the outer periphery A wire 74 is expressed by the following Formula (4):

$$Fo = Kox \qquad (4).$$

From the aforementioned relation of Ki>Ko, the restoring force Fi of the inner periphery A wire 80 is higher than the restoring force Fo of the outer periphery A wire 74 (i.e., Fi>Fo).

The angular moment of the moving unit 130 is determined by the product of the distance from a center of gravity Gt of the moving unit 130 (whereas the point of action of the focusing drive force and the center of gravity of the moving unit 130 are aligned with the optical axis La) to the spring (e.g., the inner periphery A wire 80 and the outer periphery A wire 74) and the restoring force of the position where the spring (e.g., the inner periphery A wire 80 and the outer periphery A wire 74) are fixed. If the angular moment of the restoring force Fi of the inner periphery A wire 80 and the angular moment of the restoring force Fo of the outer periphery A wire 74 are balanced, therefore, the angular moment becomes zero so that the moving unit 130 is not turned.

From the discussion thus far made, the width Wi of the inner periphery A wire 80 and the width Wo of the outer periphery A wire 74 are set to have the relation expressed by the following Formula (5):

$$FiTi = FoTo \qquad (5).$$

As has been described hereinbefore, the pickup device 200 according to the embodiment of the invention is constructed such that the distance Ti from the inner periphery A wires 80 to 104 supporting the moving unit 130 to the optical center line Oc of the objective lens 37 is made smaller than the distance To from the outer periphery A wires 74 and 94 to the optical center line Oc of the objective lens 37, and such that the width Wi of the inner periphery A wires 80 and 104 is made larger than the thickness Wo of the outer periphery A wires 74 and 94. Without causing any rolling by the angular moment of the moving unit 130, therefore, the inner periphery side of the actuator unit 140, i.e., the side of the spindle motor 180 can be made smaller than the outer periphery side so that the objective lens can be brought closer to the inner periphery side of the optical disk.

Figure 21:
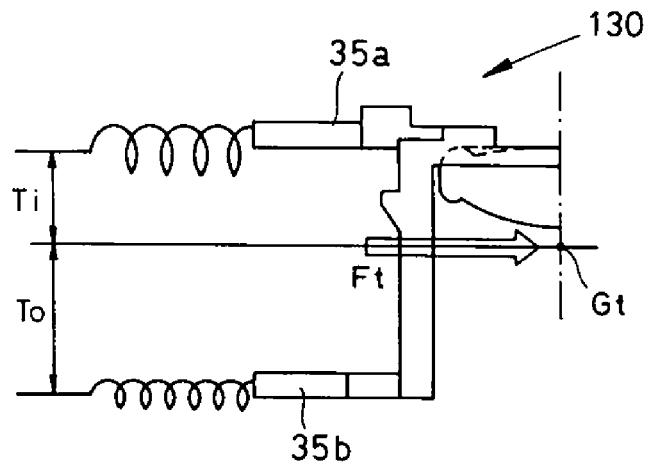
FIG. 21 is a diagram for explaining the suppression of an angular moment.

Here, the spring constants of the wire-form elastic members 74, 80, 94 and 104 can also be set different not only between the inner periphery side and the outer periphery side but also between the wire-form elastic members 74 and 80 on the upper side of the focusing direction and the wire-form elastic members 94 and 104 on the lower side. Specifically, the distance Ti from the center of gravity Gt of the moving unit 130 to the wire-form elastic members 74 and 80 on the upper side and the distance To to the wire-form elastic members 94 and 104 on the lower side are made different, as shown in FIG. 21. Where the center of gravity Gt is to be driven in the tracking direction by a drive force Ft, the spring constants; of the wire-form elastic members 74 and 80 on the upper side and the wire-form elastic members 94 and 104 on the lower side may be properly set to satisfy the aforementioned Formula (4) so that the generation of the angular moment by the restoring force of the spring may be suppressed.

On the other hand, the setting of the spring constants need not always satisfy the aforementioned Formula (4). It is contributory to the suppression of the rolling to set the spring constants different so that the angular moment to be applied to the moving unit is lower than that of the case in which all the spring constants are equal.

Figure 22:
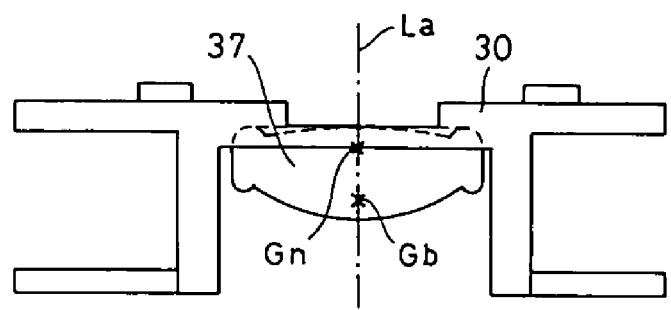
FIG. 22 is a diagram for explaining a relation between the printed circuit board coil and a counter weight is explained.
Figure 23:
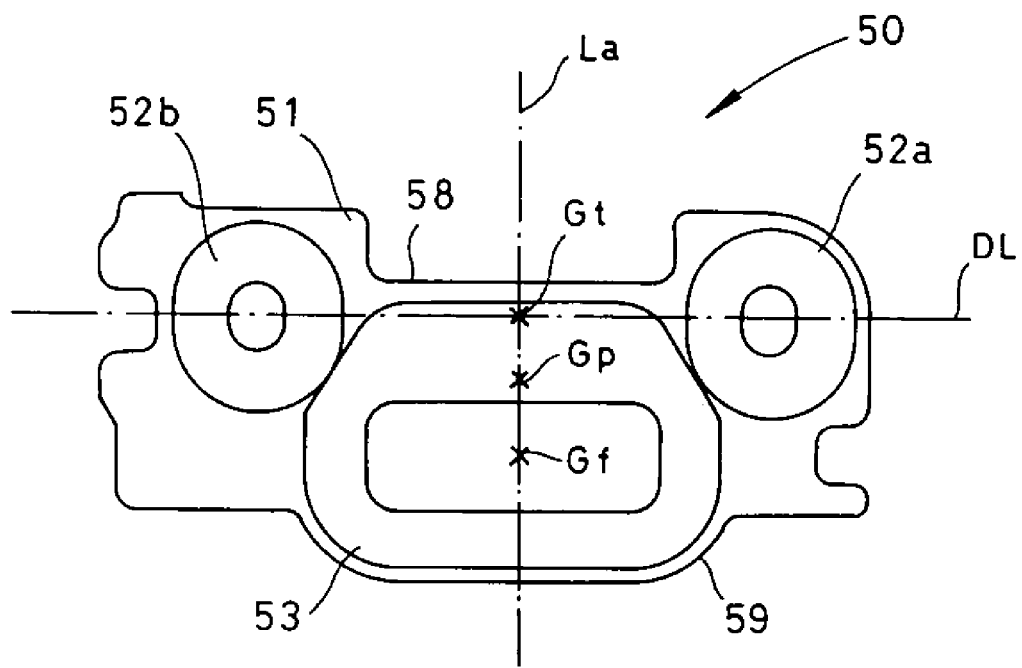
FIG. 23 is a diagram for explaining a relation between the printed circuit board coil and the counter weight.
Figure 24:
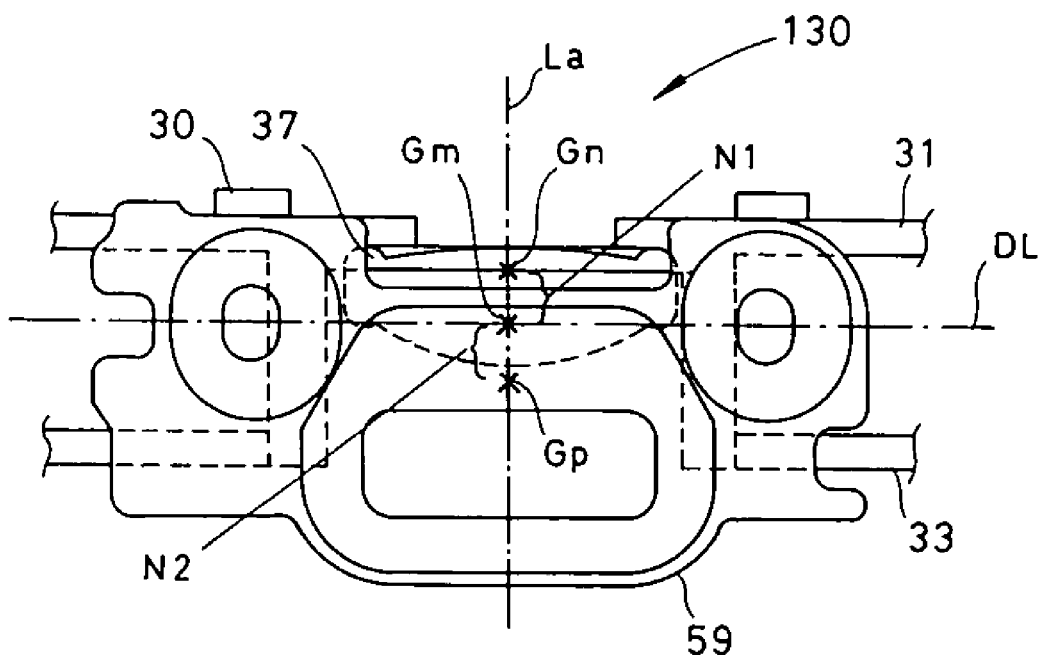
FIG. 24 is a diagram for explaining a relation between the printed circuit board coil and the counter weight.
Figure 25:
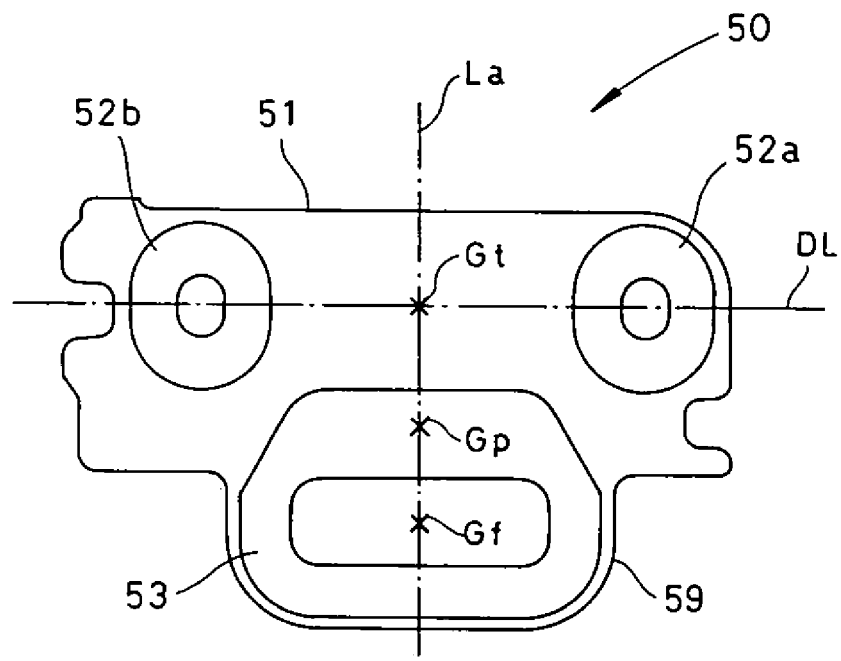
FIG. 25 is a diagram showing another embodiment of the printed circuit board coil.

Here will be described the center of gravity of the moving unit 130 with reference to FIGS. 22 to 25. In the moving unit 130, the printed circuit board A coil 50 and the printed circuit board B coil 60 are fixed as a matter of fact, but the substrates 51 and 61 of the printed circuit board A coil 50 and the printed circuit board B coil 60 are formed in the same shape so that they can be thought to have the same weight position. In order to avoid complexity of the description, therefore, FIGS. 22 to 25 show only the printed circuit board A coil 50. Here: FIG. 22 is a diagram showing the center of gravity when the objective lens 37 is held in the lens holder 30; FIG. 23 is a diagram showing the center of gravity of the printed circuit board A coil 50; and FIG. 24 is a diagram showing the center of gravity of the moving unit 130. On the other hand, FIG. 25 shows an example of the case in which the focusing A coil 53 is disposed at a lower position.

The lens holder 30 is a generally rectangular member molded out of a resin and having a hollow structure, as has been described hereinbefore, and has the top face 31 so that its center of gravity is located at the position Gb closer to the top face 31 from the center of the lens holder 30, as shown in FIG. 22. With the objective lens 37 being held in this lens holder 30, the center of gravity of the lens holder 30 moves toward the top face 31 to the position, as indicated by Gn.

On the other hand, the printed circuit board A coil 50 has the recessed notch 58 formed in the upper portion of the substrate 51 in the region between the tracking A coil 52*a* and the tracking B coil 52*b*, as shown in FIG. 23, and has the bulge 59 on the bottom portion of the substrate 51. On the other hand, the printed circuit board A coil 50 has the tracking a coil 52*a* and the tracking B coil 52*b* formed symmetrically with respect to the optical axis La. Therefore, the center of gravity of the tracking A coil 52*a* and the tracking B coil 52*b* is located at the intersection, as indicated by Gt, between the line of action DL of the tracking drive force joining the center points of the two tracking coils 52*a* and 52*b* and the optical axis La. On the other hand, the center of gravity of the focusing A coil 53 is located at the intersection, as indicated by Gf, with the optical axis La at the center of the focusing A coil 53. From the discussion thus far made, the center of gravity of the printed circuit board A coil 50 is located at a position Gp below the center of gravity Gt of the two tracking coils 52*a* and 52*b* and over the center of gravity Gf of the focusing A coil 53.

FIG. 25 shows the state in which the printed circuit board A coil 50 is fixed on the lens holder 30. If the printed circuit board A coil 50 is fixed at a position to align the top face 31 of the lens holder 30 and the top face of the substrate 51, its bulge 59 is protruded downward from the bottom face 33 of the lens holder 30.

If the distance N1 from the center of gravity Gn of the lens holder 30 holding the objective lens 37 therein to the line of action DL of the tracking drive force and the distance N2 from the center of gravity Gp of the printed circuit board A coil 50 to the line of action DL of the tracking drive force are equal to each other with the printed circuit board A coil 50 being fixed in the lens holder 30 holding the objective lens 37, the moving unit 130 has its center of gravity Gm located on the optical axis La of the objective lens 37 and on the line of action DL of the tracking drive force.

By setting the size of the notch 58 and the size of the bulge 59 at the time of designing the substrate 51 of the printed circuit board A coil 40 such that the distance N1 from the center of gravity Gn of the lens holder 30 holding the objective lens 37 to the line joining the center points of the tracking coils 52*a* and 52*b*, i.e., the line of action DL of the tracking drive force and the distance N2 from the center of gravity Gp of the printed circuit board A coil 50 to the line of action DL are equalized, therefore, the center of gravity of the moving unit 130 can be set at the intersection between the line of action DL of the tracking drive force and the optical axis La to establish no angular moment when the moving unit 130 is driven in the tracking direction. Thus, in the embodiment, the weight of the focusing coil 53 can be used as the counter weight so that adverse affects by the angular moment can be more avoided without increasing the weight of the moving unit 130 than the those of the case in which the dedicated counter weight is used.

Here, the notch 58 formed over the substrate 51 can reduce the center of gravity of the printed circuit board A coil 50 and can enlarge the distance, i.e., N2 between the line of action DL of the two tracking coils 52a and 52b and the center of gravity Gp of the printed circuit board A coil 50. As a result, the weight effect as the counter weight is enhanced. By forming the notch 58 in the substrate 51, more specifically, the weight as the counter weight can be substantially enlarged without increasing the total weight of the moving unit 130. As a result, the allowance and the versatility are improved for the weight of the objective lens 37.

On the other hand, the printed circuit board A coil 50 may be constructed such that the focusing a coil 53 is at a lower position, as shown in FIG. 25. With this construction, the center of gravity Gf of the focusing A coil 53 is located at a lower position than that of the example shown in FIG. 23, so that the center of gravity Gp of the printed circuit board A coil 50 is shifted downward. With this construction, however, the weight of the substrate 51 is made larger than that of the example shown in FIG. 23, and the bulge 59 of the substrate 51 is enlarged to restrict the moving range of the moving unit 130 in the downward focusing direction. Therefore, the shape of the printed circuit board A coil 50 is set according to the position of the center of gravity of the lens holder 30 holding the objective lens 37.

Figure 26:
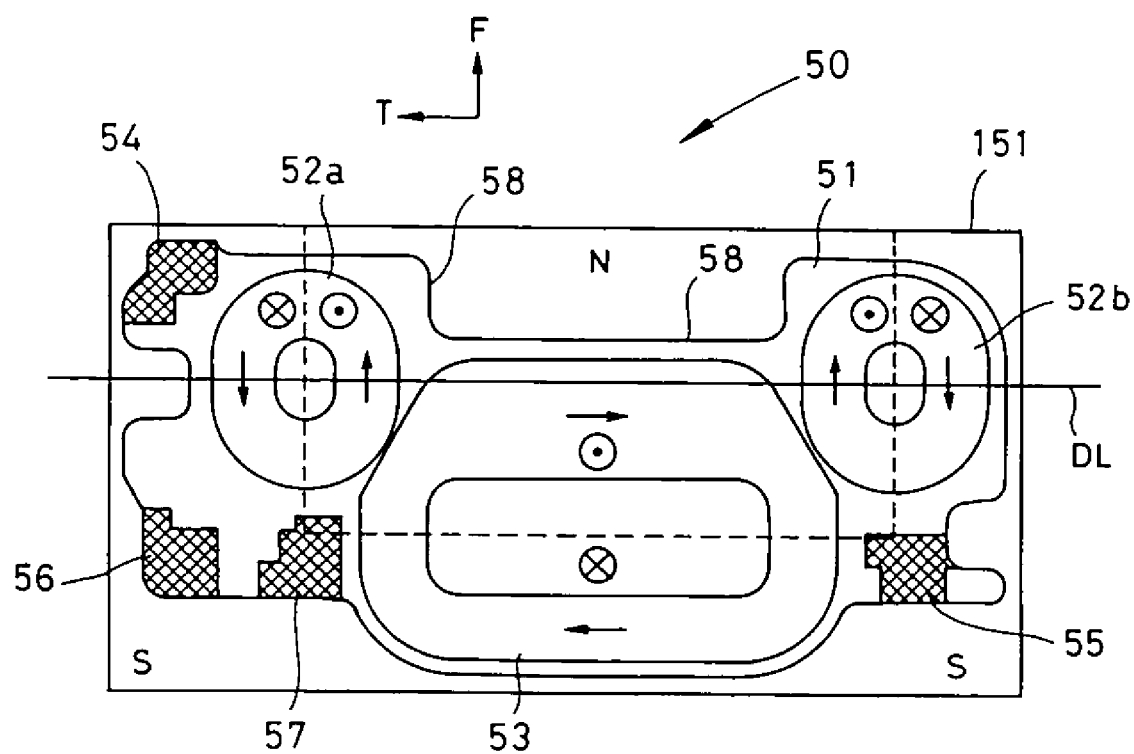
FIG. 26 is a diagram for explaining focusing and tracking drive forces.

With reference to FIG. 26, here will be described the actions of the moving unit of the pickup device 200 according to the embodiment of the invention. FIG. 26 is an explanatory diagram showing the relation between the relative positions of the printed circuit board A coil 50 and the magnet 151 when the moving unit 130 is in the normal position.

The magnet 151 is a multi-pole magnetizable magnet which is magnetized with an N pole, for example, in the generally square shape, and with a generally U-shaped S pole enclosing the N pole from the three sides. The region magnetized with the N pole generates the magnetic flux which is directed normal to the surface of the drawing from the back to the front, and the region magnetized with the S pole generates the magnetic flux which is directed normal to the drawing surface from the front to the back. As shown in FIG. 26, the individual coils, as formed in the printed circuit board A coil 50, are arranged to have their center positioned on the boundary line between the N pole and the S pole of the magnet 151.

When the tracking drive current is fed between the tracking inner periphery 54 and the tracking output terminal 55 so that the electric current flows in the direction of arrows through the tracking A coil 52a and the tracking B coil 52b, the leftward tracking drive force is generated, as indicated by arrow T. If a reverse drive current is fed, on the other hand, the rightward tracking drive force is generated, as reversed from the arrow T.

If the focusing drive current is fed to the focusing input terminal part 56 and the focusing output terminal part 57 so that the electric current in the shown direction flows through the focusing coil 53, an upward drive force is generated, as indicated by arrow F. If a reverse drive current is fed, the downward focusing drive force is generated, as reversed from the arrow F.

According to the invention, the lens holder is molded out of a resin integrally with the connection wires connecting the drive coils electrically. It is, therefore, possible to provide a highly reliable lens drive device which can avoid the disadvantage such as the breakage of the connection wires and can simplify the assembling works.

What is claimed is:

1. A lens drive device comprising:
a lens holder to which an objective lens and a plurality of drive coils having a first end for connection to a drive source and a second end for an internal connection are fixed,
a plurality of wire-form elastic members made of a metal, for supporting said lens holder from a suspension base, in which said drive coils are energized through said wire-form elastic members and said plurality of wire-form elastic members extend from the suspension base to the lens holder in a first axial direction, and
first and second boards respectively provided on both sides of said objective lens such that said objective lens is located between said first and second boards in the first axial direction,
wherein said drive coils are arranged on said first and second boards respectively, said lens holder is molded out of a resin integrally with a connection wire that extends between said drive coils positioned on both sides of said objective lens in the first axial direction that connects the second ends of said drive coils to form said internal connection and wherein said lens holder includes fixing arms which connect said plurality of wire-form elastic members and said connection wire to said lens holder, and an end of each of said plurality of wire-form elastic members is buried within each of said fixing arms.

2. A lens drive device according to claim 1, wherein said lens holder is molded integrally with said connection wires while containing at least portions of said connection wires and while being exposed at its two ends, so that said exposed portions are connection terminals to said drive coils.

3. The lens drive device of claim 1, wherein the first and second boards are arranged in parallel on both sides of the objective lens in a second axial direction, which is perpendicular to the first axial direction.

4. The lens drive device of claim 1, wherein the first and second boards are printed circuit boards having the drive coils formed thereon.

5. A lens drive device comprising:
a plurality of wire-form elastic members made of a metal;
a lens holder and a suspension base that are insert molded out of a resin on the two end sides of said plurality of wire-form elastic members such that portions of said plurality of wire form elastic members are embedded within said lens holder and said suspension base, said plurality of wire-form elastic members extending in a first axial direction from the suspension base to the lens holder;
an objective lens which is held by the lens holder; and
a plurality of drive coils having a first end for connection to a drive source and a second end for an internal connection are fixed on said molded lens holder such that said plurality of drive coils are energized through said plurality of wire-form elastic members, first and second boards respectively provided on both sides of said objective lens such that said objective lens is located between said first and second boards in the first axial direction, wherein said plurality of wire-form elastic members are provided at their one-side ends with connection terminals which are partially exposed from said lens holder and connected with said drive coils, wherein said drive coils are arranged on said first and second boards respectively, and a connection wire that is integrally molded while being contained in said lens holder extends between said drive coils positioned on both sides of said objective lens in the first axial direction that connects the second ends of said drive coils to form said internal connection.

6. A lens drive device according to claim 5, wherein said connection wires are provided at their two ends with connection terminals to be connected with said drive coils, and wherein said connection terminals are exposed from said lens holder.

7. the lens drive device of claim 5, wherein the first and second board are arranged in parallel on both sides of the objective lens in a second axial direction, which is perpendicular to the first axial direction.

8. The lens drive device of claim 5, wherein the first and second boards are printed circuit boards having the drive coils formed thereon.

9. A suspension unit for a lens drive device, comprising:
a lens holder;
a suspension base;
a plurality of wire-form elastic members made of a metal extending in a first axial direction from the suspension base to the lens holder; and first and second boards respectively provided on both sides of said objective lens such that said objective lens is located between said first and second boards in the first axial direction, wherein said lens holder and said suspension base are insert molded out of a resin on the two end sides of the plurality of wire-form elastic members such that portions of said plurality of wire form elastic members are embedded within said lens holder and said suspension base, and wherein a plurality of drive coils having a first end for connection to a drive source and a second end for an internal connection are arranged on first and second boards respectively, and a connection wire that extends between said drive coils positioned on both sides of said objective lens in the first axial direction and connects the second end of the drive coils to form said internal connection is integrally molded while being contained in said lens holder.

10. The suspension unit of claim 9, wherein the first and second board are arranged in parallel on both sides of the objective lens in a second axial direction, which is perpendicular to the first axial direction.

11. The suspension unit of claim 9, wherein the first and second boards are printed circuit boards having the drive coils formed thereon.

* * * * *